US012664122B2

(12) United States Patent
Chen et al.

(10) Patent No.: US 12,664,122 B2
(45) Date of Patent: Jun. 23, 2026

(54) PROCESS MANAGEMENT METHOD AND ELECTRONIC DEVICE

(71) Applicants: HUAWEI TECHNOLOGIES CO., LTD., Shenzhen (CN); Shanghai Institute of Microsystem and Information Technology, Chinese Academy of Sciences, Shanghai (CN)

(72) Inventors: Xiaogang Chen, Shanghai (CN); Wentao Tang, Shenzhen (CN); Shunfen Li, Shanghai (CN); Xi Li, Shanghai (CN); Junfeng Zhao, Shenzhen (CN); Xiaolong Shen, Shenzhen (CN)

(73) Assignees: Huawei Technologies Co., Ltd., Shenzhen (CN); Shanghai Institute of Microsystem and Information Technology, Chinese Academy of Sciences, Shanghai (CN)

( * ) Notice: Subject to any disclaimer, the term of this patent is extended or adjusted under 35 U.S.C. 154(b) by 0 days.

(21) Appl. No.: 18/830,297

(22) Filed: Sep. 10, 2024

(65) Prior Publication Data

US 2024/0427730 A1      Dec. 26, 2024

Related U.S. Application Data

(63) Continuation of application No. PCT/CN2023/080543, filed on Mar. 9, 2023.

(30) Foreign Application Priority Data

Mar. 11, 2022    (CN) .......................... 202210242874.2

(51) Int. Cl.
*G06F 7/00* (2006.01)
*G06F 16/11* (2019.01)
(Continued)

(52) U.S. Cl.
CPC ........ *G06F 16/119* (2019.01); *G06F 16/1847* (2019.01); *G06F 16/188* (2019.01)

(58) Field of Classification Search
CPC .. G06F 16/119; G06F 16/1847; G06F 16/188; G06F 12/0284; G06F 2212/1024;
(Continued)

(56) References Cited

U.S. PATENT DOCUMENTS 5,692,204 A * 11/1997 Rawson ................ G06F 1/3203
713/340
6,209,088 B1 * 3/2001 Reneris ................. G06F 15/177
713/1
(Continued)

FOREIGN PATENT DOCUMENTS

CN            1801096 A      7/2006
CN        102841674 A      12/2012
(Continued)

*Primary Examiner* — Mohammed R Uddin
(74) *Attorney, Agent, or Firm* — Leydig, Voit & Mayer, Ltd.

(57) ABSTRACT

A process management method and a related electronic device are provided. According to the method, process data in a volatile memory can be migrated to a non-volatile memory in real time in a running process of a system. When the system is asleep, data in a memory does not need to be packaged and backed up. When the system is woken up or restarted, data does not need to be parsed and reconstructed, to implement quick sleeping and waking up of the system. In addition, even if the system is restarted due to an unexpected power failure, a loss of key data in the memory can be avoided, and a speed of waking up or restarting the system can also be improved.

20 Claims, 17 Drawing Sheets

(51) Int. Cl.
*G06F 16/18* (2019.01)
*G06F 16/188* (2019.01)

(58) Field of Classification Search
CPC ..... G06F 2212/1032; G06F 2212/2022; G06F 9/445; G06F 12/0638; G06F 12/0238; G06F 11/07; G06F 9/4401
See application file for complete search history.

(56) References Cited

U.S. PATENT DOCUMENTS

| | | | |
|---|---|---|---|
| 9,542,310 B2* | 1/2017 | Barrall | G06F 12/0246 |
| 10,289,544 B2* | 5/2019 | Geml | G06F 3/0665 |
| 10,817,421 B2* | 10/2020 | Talagala | G06F 12/0804 |
| 10,942,815 B2* | 3/2021 | Poojary | G06F 3/061 |
| 12,333,533 B1* | 6/2025 | Osterkamp | G06Q 20/3674 |
| 2007/0032228 A1* | 2/2007 | Varanda | G06F 11/0742 |
| | | | 455/418 |
| 2007/0124552 A1* | 5/2007 | Chen | G06F 11/1441 |
| | | | 711/162 |
| 2008/0016274 A1* | 1/2008 | Wang | G06F 11/1441 |
| | | | 711/113 |
| 2008/0235486 A1* | 9/2008 | Sepulveda | G06F 3/0619 |
| | | | 711/206 |
| 2010/0153660 A1* | 6/2010 | Lasser | G06F 12/0246 |
| | | | 711/E12.001 |
| 2012/0265921 A1* | 10/2012 | Post | G06F 12/0638 |
| | | | 711/E12.008 |
| 2013/0166783 A1* | 6/2013 | Kim | G06F 3/0614 |
| | | | 710/6 |
| 2014/0195480 A1* | 7/2014 | Talagala | G06F 16/2365 |
| | | | 707/610 |
| 2014/0195564 A1* | 7/2014 | Talagala | G06F 12/0804 |
| | | | 707/802 |
| 2014/0325116 A1* | 10/2014 | Mckelvie | G06F 11/14 |
| | | | 711/103 |
| 2015/0261544 A1* | 9/2015 | Manlapat | G06F 1/24 |
| | | | 713/2 |
| 2016/0210066 A1* | 7/2016 | Yamaura | G06F 3/068 |
| 2017/0322740 A1* | 11/2017 | Gabryjelski | G06F 3/067 |
| 2018/0107417 A1* | 4/2018 | Shechter | G06F 3/0619 |
| 2018/0173536 A1* | 6/2018 | Sela | G06F 9/441 |
| 2018/0225201 A1* | 8/2018 | Fevrier | G06F 11/1441 |
| 2020/0104067 A1* | 4/2020 | Shaharabany | G06F 3/0644 |
| 2021/0081242 A1* | 3/2021 | Ivey | G06F 9/50 |
| 2024/0427730 A1* | 12/2024 | Chen | G06F 12/0638 |

FOREIGN PATENT DOCUMENTS

| | | |
|---|---|---|
| CN | 103927145 A | 7/2014 |
| CN | 108052541 A | 5/2018 |

* cited by examiner

Daemon process

PROCESS MANAGEMENT METHOD AND ELECTRONIC DEVICE

CROSS-REFERENCE TO RELATED APPLICATIONS

This application a continuation of International Application No. PCT/CN2023/080543, filed on Mar. 9, 2023, which claims priority to Chinese Patent Application No. 202210242874.2, filed on Mar. 11, 2022. The disclosures of the aforementioned applications are hereby incorporated by reference in their entireties.

TECHNICAL FIELD

Embodiments of this application relate to the field of memory management technologies, and in particular, to a process management method and an electronic device.

BACKGROUND

Due to limitation of power consumption and a volume, a current embedded electronic device has limited processor computability, and cannot use a high-performance processor chip with a high frequency and high energy consumption. Although an embedded system in the embedded electronic device is tailored in scale, disadvantages in hardware of the embedded system still lead to a slow startup speed of the system. As a result, requirements of consumers cannot be met.

A startup time of the embedded system is mainly consumed in the following processes: (1) copy kernel code to a memory for execution. (2) check and initialize a peripheral, especially initialize a network connection and mount a file system. (3) start an application, and the alike. When the embedded system is started, related information needs to be read to the memory, so that the system can be started normally. This process takes a long time.

SUMMARY

Embodiments of this application provide a process management method and an electronic device, to implement quick startup of a system.

According to a first aspect, this application provides a process management method. The method is applied to an electronic device. The electronic device includes a hybrid memory including a volatile memory and a non-volatile memory. The method includes: in a process in which the electronic device starts a system for the first time, the electronic device generates data of a first process in the volatile memory. Duration in which the electronic device completes starting the system for the first time is T1. The first process is a process recorded in a to-be-persistent process list in the electronic device. In a running process of the system of the electronic device, the electronic device migrates the data of the first process to the non-volatile memory, and keeps normal running of the system of the electronic device. In a process in which the electronic device starts the system for the second time, the electronic device links the data of the first process in the non-volatile memory to a system process linked list. Duration in which the electronic device completes starting the system for the second time is T2. Herein, T2 is less than T1.

In the foregoing embodiment, the electronic device may migrate the data of the first process in the volatile memory to the non-volatile memory in the running process of the system, and keep normal running of the system of the electronic device. When the electronic device is woken up from sleep, is restarted from a power outage, or is restarted normally, the data of the first process no longer needs to be generated, provided that a pointer of the data that is of the first process and that is stored in the non-volatile memory is modified and linked to the system process linked list. This greatly improves a startup speed of the system and implements quick startup of the system.

With reference to some embodiments of the first aspect, in some embodiments, the method further includes: In the running process of the system of the electronic device, the electronic device generates data of a second process in the volatile memory. The second process is different from the first process. The second process is another process recorded in the to-be-persistent process list. When the second process is suspended, the electronic device migrates the data of the second process to the non-volatile memory.

In the foregoing embodiment, during normal running of the system, the electronic device may migrate, to the non-volatile memory, another started persistent process recorded in the to-be-persistent process list. In this way, when the system needs to sleep, quick sleep and wakeup can be implemented without transferring data of a process in the to-be-persistent process list. When a power failure suddenly occurs in the system, security of data of a process in the to-be-persistent process list can also be ensured. When a power failure suddenly occurs in the system and the system is restarted, a pointer needs to be modified, and data of these processes does not need to be regenerated or migrated to the memory. In this way, the system can be quickly started.

With reference to some embodiments of the first aspect, in some embodiments, the non-volatile memory includes a non-volatile process file system. The non-volatile process file system includes a superblock, a process control block node, a page bitmap, and a persistent process file data block. That the electronic device migrates the data of the first process to the non-volatile memory specifically includes that the electronic device migrates a process control block of the first process to the process control block node in the non-volatile process file system, and the electronic device migrates a page in a page tree table of the first process to the persistent process file data block. The process control block of the first process and the page in the page tree table of the first process form a first persistent process file in the non-volatile process file system. The process control block of the first process is used as an identifier of the first persistent process file. That the electronic device migrates the data of the second process to the non-volatile memory specifically includes that the electronic device migrates a process control block of the second process to the process control block node in the non-volatile process file system, and the electronic device migrates a page in a page tree table of the second process to the persistent process file data block. The process control block of the second process and the page in the page tree table of the second process form a second persistent process file in the non-volatile process file system. The process control block of the second process is used as an identifier of the second persistent process file.

In the foregoing embodiment, a layout manner similar to that of a common file system may be used to store a process file in the non-volatile process file system of the non-volatile memory, to obtain a persistent process file for which a process control block is used as an identifier. These persistent process files are still linked to the system process linked list in the memory and can be run normally. After sleep or a power failure of the system, operations such as opening, accessing, modifying, backing up, and deleting may be performed on the persistent process file in a conventional file manner, with no need to perform parsing and reconstruction, so that operation and maintenance personnel can analyze a process running status or extract key data when the process cannot work normally.

With reference to some embodiments of the first aspect, in some embodiments, the method further includes: The electronic device periodically backs up a persistent process file in the non-volatile process file system to an external memory. The persistent process file includes the first persistent process file and the second persistent process file.

In the foregoing embodiment, because the persistent process file may be backed up periodically, when the electronic device cannot be recovered due to a serious hardware or software fault, a backup persistent process file may be used for recovery to implement a quick running withdrawal.

With reference to some embodiments of the first aspect, in some embodiments, the method further includes: After running of the second process ends, the electronic device deletes the second persistent process file from the non-volatile process file system.

In the foregoing embodiment, the second persistent process file is deleted after running of the process ends, so that limited space of the memory can be fully and valuably utilized.

With reference to some embodiments of the first aspect, in some embodiments, that the electronic device migrates the process control block of the second process to the process control block node in the non-volatile process file system specifically includes that the electronic device copies the process control block of the second process to the process control block node in the non-volatile process file system; when the second process is suspended, the electronic device links the process control block of the second process in the process control block node to the system process linked list; and the electronic device deletes the process control block of the second process from the volatile memory.

In the foregoing embodiment, the process control block is first copied to the process control block node, and redundant data in the volatile memory is deleted after the process control block in the node is linked to the system process linked list. In this way, it can be ensured that a migration process does not affect normal running of the persistent process. In addition, security of migrated data can be ensured.

With reference to some embodiments of the first aspect, in some embodiments, that the electronic device migrates the page in the page tree table of the second process to the persistent process file data block specifically includes that when the page in the page tree table of the second process is not in an active page list, the electronic device moves the page in the page tree table of the second process to the persistent process file data block, and performs linking to the page tree table of the second process.

In the foregoing embodiment, migration is performed only when a page is not an active page, to ensure security and integrity of process data.

With reference to some embodiments of the first aspect, in some embodiments, the method further includes: The electronic device updates a first page in the page tree table of the second process in the non-volatile process file system.

In the foregoing embodiment, the electronic device may directly update a page in the non-volatile process file system, to improve update efficiency of a page that is not frequently updated.

With reference to some embodiments of the first aspect, in some embodiments, after the electronic device migrates the page in the page tree table of the second process to the persistent process file data block, the method further includes: The electronic device marks, as read-only, a second page in the page tree table of the second process in the persistent process file data block. After it is determined that the second page is added to the active page list, the electronic device migrates the second page to a virtual file system in the volatile memory. The electronic device updates the second page in the virtual file system.

In the foregoing embodiment, the electronic device may migrate an active page to the virtual file system and then update the active page, to greatly improve update efficiency of an active page.

With reference to some embodiments of the first aspect, in some embodiments, the method further includes: After a power failure message or an exit message is received, the electronic device migrates the second page to the persistent process file data block.

In the foregoing embodiment, even if a temporary power failure or exit occurs, the electronic device can have enough time to migrate a small quantity of active pages in the virtual file system to the persistent process file data block, to ensure integrity of the persistent process file and further improve a speed of starting the system again.

According to a second aspect, an embodiment of this application provides an electronic device. The electronic device includes one or more processors and a storage. The storage includes a volatile memory and a non-volatile memory. The volatile memory and the non-volatile memory form a hybrid memory. The storage is coupled to the one or more processors. The storage is configured to store computer program code. The computer program code includes computer instructions. The one or more processors invoke the computer instructions, so that the electronic device performs the method described in any one of the first aspect or the possible implementations of the first aspect.

According to a third aspect, an embodiment of this application provides an electronic device. The electronic device includes a hybrid memory including a volatile memory and a non-volatile memory. The electronic device further includes a process generating module, a migration module, and a linking module. The process generating module is configured to: in a process in which the electronic device starts a system for the first time, generate data of a first process in the volatile memory. Duration in which the electronic device completes starting the system for the first time is T1. The first process is a process recorded in a to-be-persistent process list in the electronic device. The migration module is configured to: in a running process of the system of the electronic device, migrate the data of the first process to the non-volatile memory, and keep normal running of the system of the electronic device. The linking module is further configured to: in a process in which the electronic device starts the system for the second time, link the data of the first process in the non-volatile memory to a system process linked list. Duration in which the electronic device completes starting the system for the second time is T2. Herein, T2 is less than T1.

With reference to some embodiments of the third aspect, in some embodiments, the process generating module is further configured to: in the running process of the system of the electronic device, generate data of a second process in the volatile memory. The second process is different from the first process. The second process is another process recorded in the to-be-persistent process list. The migration module is further configured to: when the second process is suspended, migrate the data of the second process to the non-volatile memory.

With reference to some embodiments of the third aspect, in some embodiments, the non-volatile memory includes a non-volatile process file system. The non-volatile process file system includes a superblock, a process control block node, a page bitmap, and a persistent process file data block. The migration module is specifically configured to: migrate a process control block of the first process to the process control block node in the non-volatile process file system; migrate a page in a page tree table of the first process to the persistent process file data block, where the process control block of the first process and the page in the page tree table of the first process form a first persistent process file in the non-volatile process file system, and the process control block of the first process is used as an identifier of the first persistent process file; migrate a process control block of the second process to the process control block node in the non-volatile process file system; and migrate a page in a page tree table of the second process to the persistent process file data block, where the process control block of the second process and the page in the page tree table of the second process form a second persistent process file in the non-volatile process file system, and the process control block of the second process is used as an identifier of the second persistent process file.

With reference to some embodiments of the third aspect, in some embodiments, the electronic device further includes: a backup module, configured to periodically back up a persistent process file in the non-volatile process file system to an external memory, where the persistent process file includes the first persistent process file and the second persistent process file.

With reference to some embodiments of the third aspect, in some embodiments, the electronic device further includes: a deletion module, configured to: after running of the second process ends, delete the second persistent process file from the non-volatile process file system.

With reference to some embodiments of the third aspect, in some embodiments, the migration module is specifically configured to: copy the process control block of the second process to the process control block node in the non-volatile process file system; when the second process is suspended, link the process control block of the second process in the process control block node to the system process linked list; and delete the process control block of the second process from the volatile memory.

With reference to some embodiments of the third aspect, in some embodiments, the migration module is specifically configured to: when the page in the page tree table of the second process is not in an active page list, move the page in the page tree table of the second process to the persistent process file data block, and perform linking to the page tree table of the second process.

With reference to some embodiments of the third aspect, in some embodiments, the electronic device further includes: an update module, configured to update a first page in the page tree table of the second process in the non-volatile process file system.

With reference to some embodiments of the third aspect, in some embodiments, the migration module is further configured to: mark, as read-only, a second page in the page tree table of the second process in the persistent process file data block; after it is determined that the second page is added to the active page list, migrate the second page to a virtual file system in the volatile memory; and update the second page in the virtual file system.

With reference to some embodiments of the third aspect, in some embodiments, the migration module is further configured to: after a power failure message or an exit message is received, migrate the second page to the persistent process file data block.

According to a fourth aspect, an embodiment of this application provides a chip system. The chip system is applied to an electronic device. The chip system includes one or more processors. The processor is configured to invoke computer instructions, so that the electronic device performs the method described in any one of the first aspect and the possible implementations of the first aspect.

According to a fifth aspect, an embodiment of this application provides a computer program product including instructions. When the computer program product runs on an electronic device, the electronic device is enabled to perform the method described in any one of the first aspect and the possible implementations of the first aspect.

According to a sixth aspect, an embodiment of this application provides a computer-readable storage medium, including instructions. When the instructions are run on an electronic device, the electronic device is enabled to perform the method described in any one of the first aspect and the possible implementations of the first aspect.

It may be understood that the electronic device provided in the second aspect, the electronic device provided in the third aspect, the chip system provided in the fourth aspect, the computer program product provided in the fifth aspect, and the computer storage medium provided in the sixth aspect are all configured to perform the method provided in embodiments of this application. Therefore, for beneficial effects that can be achieved, refer to the beneficial effects in the corresponding method. Details are not described herein again.

DESCRIPTION OF EMBODIMENTS

Figure 1:
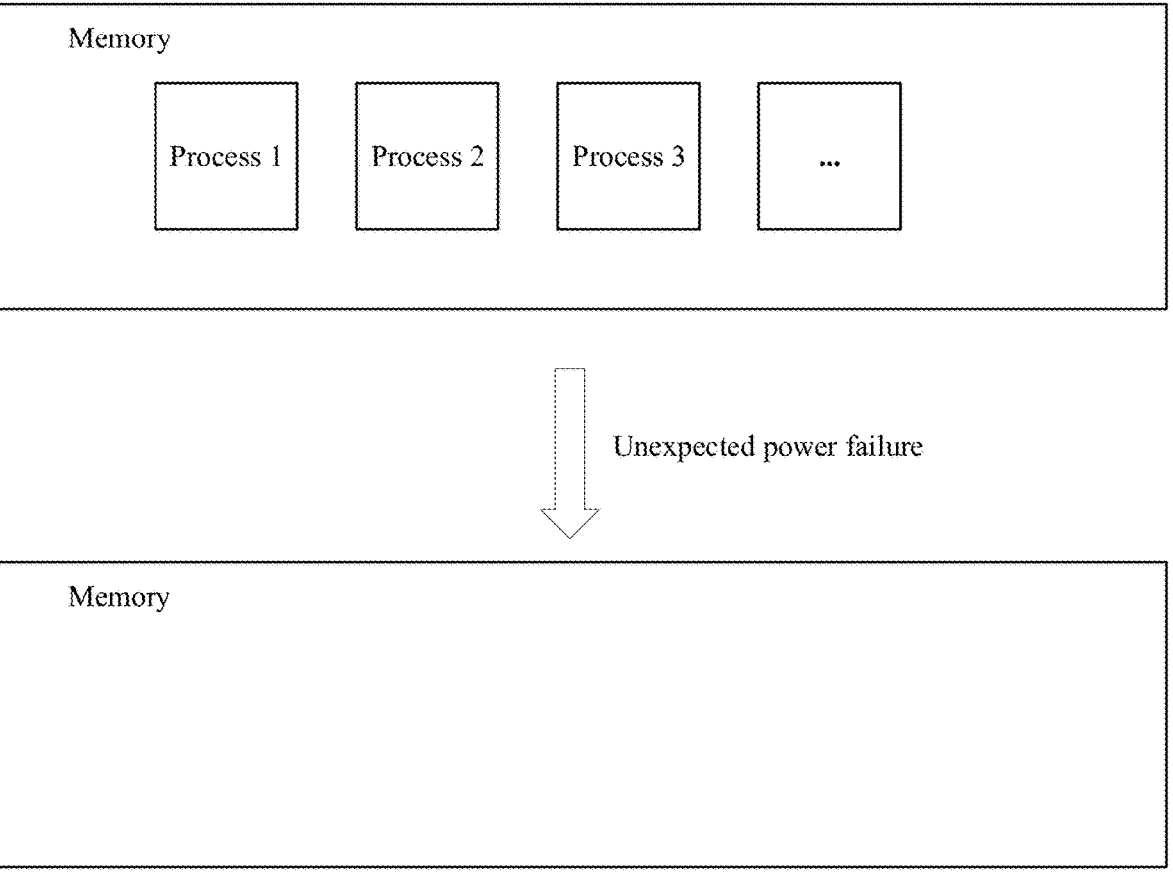
FIG. 1 is a diagram of an example scenario of a data storage status in a memory after an unexpected power failure occurs during running of a system.

Terms used in the following embodiments of this application are merely intended to describe specific embodiments, but are not intended to limit this application. As used in this specification and the claims of this application, singular expressions "one", "a", "the", "foregoing", "this", and "this one" are intended to include plural expressions, unless otherwise clearly specified in the context. It should also be understood that the term "and/or" used in this application means and includes any or all possible combinations of one or more listed items.

The following terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of embodiments of this application, unless otherwise specified, "a plurality of" means two or more.

For ease of understanding, the following first describes related terms and concepts used in embodiments of this application.

(1) Memory and External Memory

A memory is also referred to as a main memory. The memory is storage space that can be directly addressed by a processor. The memory is configured to temporarily store computing data in the processor and data exchanged with an external memory such as a hard disk.

The external memory is also referred to as an external storage. The external memory means a storage other than a computer memory and a processor cache. Common external storages include a hard disk, a floppy disk, an optical disc, a USB flash drive, and the like.

(2) File System

A file system of a computer is a method of storing and organizing computer data. By using the file system, it becomes easy to access and search for computer data. In the file system, abstract logical concepts of a file and a tree directory are used to replace concepts of data blocks used by physical devices such as a hard disk and an optical disc. When using the file system to store data, a user does not need to care about a specific actual address of a data block for storing data in a hard disk (or an optical disc), and the user only needs to remember a directory and a file name of a file. Before new data is written, the user does not need to care about a case that a block address in the hard disk is not used. A storage space management (allocation and release) function in the hard disk is automatically completed by the file system. The user only needs to remember a specific file into which the data is written.

(3) Process and Process Control Block (PCB)

A process is a basic unit for resource allocation performed by an operating system. Each process has one PCB. Creation and cancellation of a process are operations on a process control block. A plurality of processes can be executed concurrently.

The PCB is a part of a process entity, and is an important record-type data structure in the operating system. In the PCB, all information that is needed by the operating system and that is used to describe a current state of a process and control running of the process is recorded. When a process is created, a PCB is created for the process. When the process ends, the PCB is reclaimed. In this case, the process disappears accordingly. The PCB can be read or modified by a plurality of modules in the operating system, for example, read or modified by a scheduling program, a resource allocation program, a processing interruption program, and a supervision and analysis program. Because the PCB is frequently accessed by a system, especially by a dispatch program and a very frequently running process, the PCB needs to reside in the memory. The system organizes all PCBs into several linked lists (or queues) and stores these linked lists in a PCB area specially created in a memory by the operating system.

(4) Non-Volatile Memory (NVM) and Volatile Memory

An NVM is a storage in which stored data does not disappear after a current is cut off.

A volatile memory is a storage that cannot retain data after a current is cut off, and may also be referred to as a random access memory (RAM). Currently, a commonly used RAM is a dynamic random access memory (d DRAM). Usually, the DRAM is used as a memory, and the NVM is used as an external memory.

In a process management solution, when a system is asleep, process-related data in the memory may be migrated to the NVM for storage at a time; and when the system is woken up, the data is migrated to the DRAM and the process is reconstructed, to improve a speed of waking up the system after the system is asleep.

However, if such a solution is used, there are at least the following problems:

1. To ensure a migration speed, during sleep, migration-related data is packaged and backed up by using a specific structure. The packaged and backed-up data needs to be parsed and reconstructed to the memory when the system is woken up. The system can be woken up only after parsing and reconstruction are completed. Data parsing and reconstruction take a long time. If the parsing and reconstruction fail, the system cannot be woken up.

2. If the system is restarted due to an unexpected power failure or the like, there is not enough time to migrate data in the memory to the NVM. When the system is restarted, it takes a very long time to recover the data in the memory. As shown in FIG. 1, when the system runs, the memory stores data related to processes such as a process 1, a process 2, and a process 3. After an unexpected power failure occurs in the system, all data in the memory is lost. As a result, when the system is restarted, it takes a very long time to recover the data in the memory.

However, according to a process management method provided in embodiments of this application, the data in the memory does not need to be packaged and backed up when the system is asleep, and the data does not need to be parsed and reconstructed when the system is woken up or restarted, to implement quick sleeping and waking up of the system. In addition, even if the system is restarted due to an unexpected power failure, a loss of key data in the memory can be avoided, and a speed of waking up or restarting the system can also be improved.

The following first describes an example of an electronic device 100 provided in an embodiment of this application.

The electronic device in various embodiments of the present disclosure may include at least one of the following: a smartphone, a tablet personal computer (PC), a mobile phone, a video phone, an e-book reader, a desktop PC, a laptop PC, a netbook computer, a workstation, a server, a personal digital assistant (PDA), a portable multimedia player (PMP), a moving picture experts group (MPEG-1 or MPEG-2) audio layer 3 (MP3) player, a mobile medical device, a camera, or a wearable device (for example, smart glasses, a head-mounted device (HMD), electronic clothes, an electronic band, an electronic necklace, an electronic accessory, an electronic tattoo, a smart mirror, or a smartwatch).

According to some embodiments, the electronic device may be a smart appliance. The smart appliance may include, for example, at least one of the following: a television (TV), a digital versatile disc (DVD) player, a sounder, a refrigerator, an air conditioner, a cleaner, an oven, a microwave oven, a washing machine, an air purifier, a set-top box, a home automation control panel, a security control panel, a TV box, a game console (for example, Xbox™ and PlayStation™), an electronic dictionary, an electronic key, a video camera, and a digital photo frame.

According to another embodiment, the electronic device may include at least one of the following: a medical device (for example, various portable medical measurement devices (for example, a blood glucose monitoring device, a heart rate measurement device, a blood pressure measurement device, and a body temperature measurement device), magnetic resonance angiography (MRA), magnetic resonance imaging (MRI), computed tomography (CT), a scanner, and an ultrasonic device), a navigation electronic device, a global positioning system (GPS) receiver, an event data recorder (EDR), a flight data recorder (FDR), a vehicle information entertainment device, a marine electronic device (for example, a navigation system and a compass), an aviation electronic device, a security device, an automotive head unit, an industrial robot or a household robot, an automated teller machine (ATM) of a financial institution, a point of sales (POS) of a store, or an Internet of things (for example, a light bulb, various sensors, an electric meter, a gas meter, a sprinkler device, a fire alarm, a thermostat, a street lamp, a toaster, sports equipment, a hot water tank, a heater, or a boiler).

According to some embodiments, the electronic device may include at least one of the following: a part of furniture or a building/structure, an electronic board, an electronic signature receiving device, a projector, or various measurement instruments (for example, a water meter, an electric meter, a gas meter, or a wavemeter). The electronic device according to various embodiments may be one of or a combination of more of the foregoing devices. According to some embodiments, the electronic device may be a flexible electronic device. In addition, the electronic devices according to various embodiments of the present disclosure are not limited to the foregoing devices, and may include new electronic devices developed according to technologies.

Figure 2:
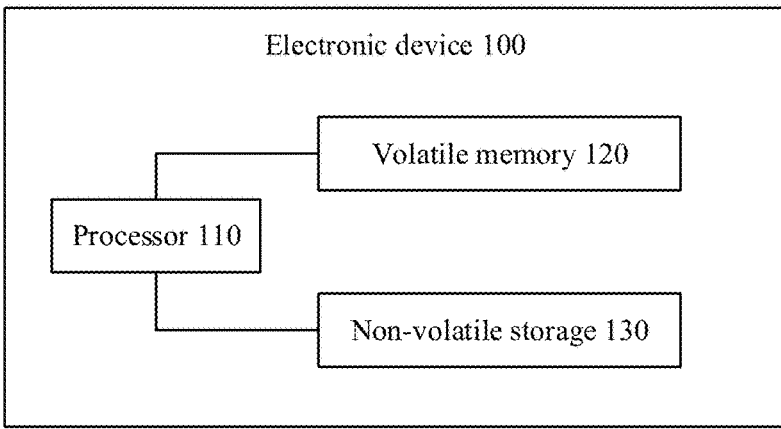
FIG. 2 is a diagram of a partial structure of an electronic device 100 according to an embodiment of this application.

FIG. 2 is a diagram of a partial structure of an electronic device 100 according to an embodiment of this application.

It should be understood that the electronic device 100 may have more components than those shown in the figure. Various components shown in the figure may be implemented by using hardware including one or more signal processors and/or application-specific integrated circuits, software, or a combination of hardware and software.

The electronic device 100 may include at least a processor 110, a volatile memory 120, and a non-volatile storage 130.

The processor 110 may include one or more processing units. For example, the processor 110 may include an application processor (AP), a modem processor, a graphics processing unit (GPU), an image signal processor (ISP), a controller, a storage, a video codec, a digital signal processor (DSP), a baseband processor, and/or a neural-network processing unit (NPU). Different processing units may be independent devices, or may be integrated into one or more processors.

The controller may be a nerve center and a command center of the electronic device 100. The controller may generate an operation control signal based on an instruction operation code and a time sequence signal, to complete control of instruction fetching and instruction execution.

A storage may be further disposed in the processor 110, and is configured to store instructions and data. In some embodiments, the storage in the processor 110 is a cache. The storage may store instructions or data that has been used or is cyclically used by the processor 110. If the processor 110 needs to use the instructions or the data again, the processor may directly invoke the instructions or the data from the storage. This avoids repeated access, reduces a waiting time of the processor 110, and improves system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The I2C interface is a two-way synchronization serial bus, and includes one serial data line (SDA) and one serial clock line (SCL). In some embodiments, the processor 110 may include a plurality of groups of I2C buses. The processor 110 may be separately coupled to a touch sensor, a charger, a flash, a camera, and the like through different I2C bus interfaces. For example, the processor 110 may be coupled to the touch sensor through the I2C interface, so that the processor 110 communicates with the touch sensor through the I2C bus interface, to implement a touch function of the electronic device 100.

The I2S interface may be configured to implement audio communication. In some embodiments, the processor 110 may include a plurality of groups of I2S buses. The processor 110 may be coupled to an audio module through the I2S bus, to implement communication between the processor 110 and the audio module. In some embodiments, the audio module may transmit an audio signal to a wireless communication module through the I2S interface, to implement a function of answering a call through a Bluetooth headset.

The PCM interface may also be configured to implement audio communication, and sample, quantize, and encode an analog signal. In some embodiments, the audio module may be coupled to the wireless communication module through a PCM bus interface. In some embodiments, the audio module may alternatively transmit an audio signal to the wireless communication module through the PCM interface, to implement a function of answering a call through the Bluetooth headset. Both the I2S interface and the PCM interface may be configured to implement audio communication.

The UART interface is a universal serial data bus, and is configured to implement asynchronous communication. The bus may be a two-way communication bus. The bus converts to-be-transmitted data between serial communication and parallel communication. In some embodiments, the UART interface is usually configured to connect the processor 110 to the wireless communication module. For example, the processor 110 communicates with a Bluetooth module in the wireless communication module through the UART interface, to implement a Bluetooth function. In some embodiments, the audio module may transmit an audio signal to the wireless communication module through the UART interface, to implement a function of playing music through the Bluetooth headset.

The MIPI interface may be configured to connect the processor 110 to a peripheral component such as a display or the camera. The MIPI interface includes a camera serial interface (CSI), a display serial interface (DSI), and the like. In some embodiments, the processor 110 communicates with the camera through the CSI interface, to implement a photographing function of the electronic device 100. The processor 110 communicates with the display through the DSI interface, to implement a display function of the electronic device 100.

The GPIO interface may be configured by using software. The GPIO interface may be configured as a control signal, or may be configured as a data signal. In some embodiments, the GPIO interface may be configured to connect the processor 110 to the camera, the display, the wireless communication module, the audio module, the sensor module, or the like. The GPIO interface may be further configured as the I2C interface, the I2S interface, the UART interface, the MIPI interface, or the like.

The SIM interface may be configured to communicate with a SIM card interface, to implement a function of transmitting data to a SIM card or reading data in a SIM card.

The USB interface is an interface that conforms to a USB standard specification, and may be specifically a mini USB interface, a micro USB interface, a USB type-C interface, or the like. The USB interface may be configured to connect to a charger to charge the electronic device 100, or may be configured to transmit data between the electronic device 100 and a peripheral device, or may be configured to connect to a headset, to play audio through the headset. The interface may be further configured to connect to another electronic device such as an AR device.

It may be understood that an interface connection relationship between the modules shown in this embodiment of this application is merely an example for description, and does not constitute a limitation on the structure of the electronic device 100. In some other embodiments of this application, the electronic device 100 may alternatively use an interface connection manner different from that in the foregoing embodiment, or use a combination of a plurality of interface connection manners.

The volatile memory 120 may include a static random access memory (SRAM), a dynamic random access memory (DRAM), a synchronous dynamic random access memory (SDRAM), a double data rate synchronous dynamic random access memory (DDR SDRAM, for example, a fifth-generation DDR SDRAM is generally referred to as a DDR5 SDRAM), and the like.

The non-volatile storage 130 may include a magnetic disk storage device and a flash memory.

According to an operating principle, the flash memory may be classified into NOR FLASH, NAND FLASH, 3D NAND FLASH, and the like. According to potential orders of storage cells, the flash memory may be classified into a single-level cell (SLC), a multi-level cell (MLC), a triple-level cell (TLC), a quad-level cell (QLC), and the like. According to a storage specification, the flash memory may be classified into a universal flash storage (UFS), an embedded multimedia memory card (eMMC), and the like.

In this embodiment of this application, the volatile memory 120 and all or a part of the non-volatile storage 130 may form a hybrid memory structure. The non-volatile storage 130 and the volatile memory 120 are addressed in a unified manner, and both support direct read/write of the processor. Optionally, in the hybrid memory structure, a capacity of the NVM memory is set to be greater than a capacity of the RAM memory.

For ease of description, in this embodiment of this application, a part including the volatile memory 120 in the hybrid memory structure is referred to as a volatile memory, and a part including the non-volatile storage 130 is referred to as a non-volatile memory.

For ease of description, in embodiments of this application, an operating system running on the electronic device 100 may be referred to as a system for short.

Figure 3:
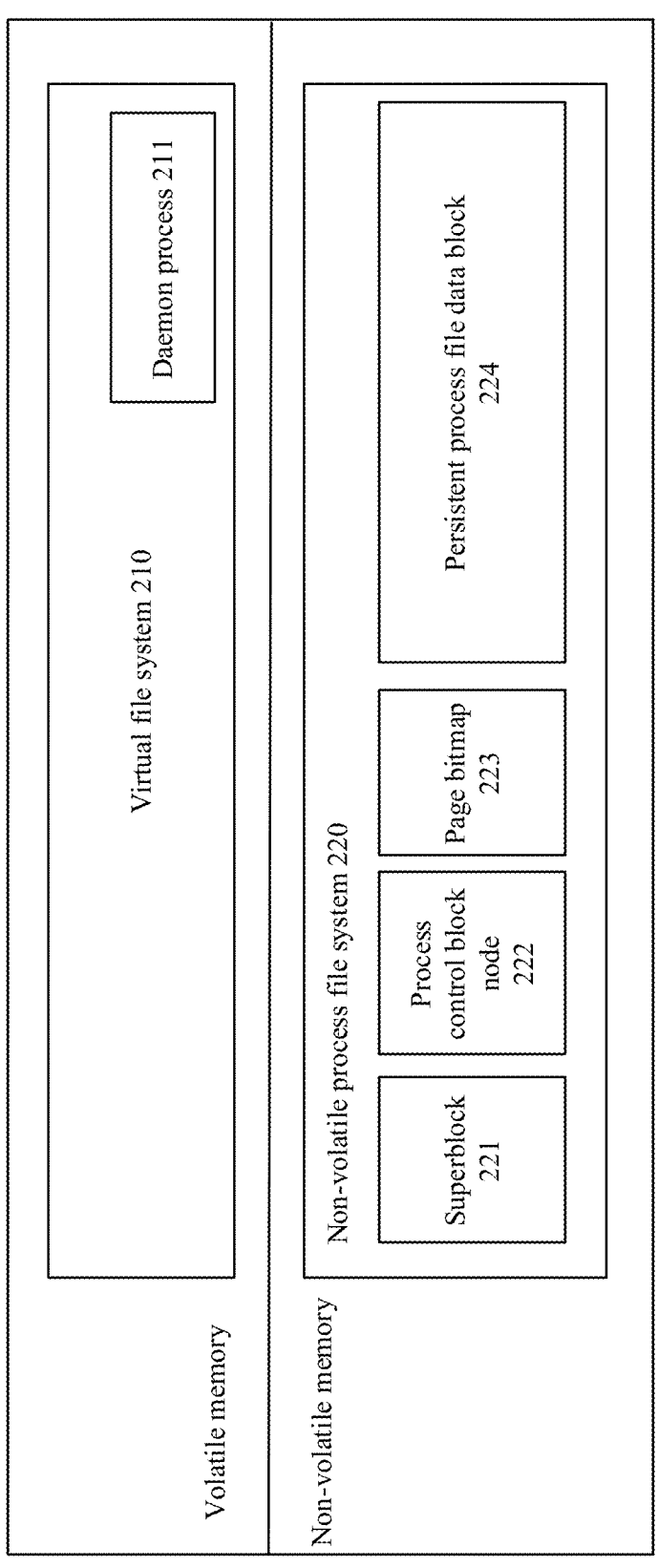
FIG. 3 is a diagram of an example structure of a hybrid memory structure according to an embodiment of this application.

FIG. 3 is a diagram of an example structure of a hybrid memory structure according to an embodiment of this application.

When a system runs, a virtual file system 210 (VFS) may run in a volatile memory included in the hybrid memory structure, to store process-related data when an operating system starts a process. In some embodiments of this application, the VFS 210 may also be referred to as a volatile file system.

A non-volatile process file system 220 (NV-Proc FS) may run in a non-volatile memory included in the hybrid memory structure, and is configured to store data that is related to a persistent process and that is migrated from the volatile file system.

It may be understood that the electronic device 100 may store a to-be-persistent process list, and record an identifier of a process that needs to be persistent. The to-be-persistent process list may be built in the electronic device 100 before delivery, or may be pushed by a system maintenance party, or may be updated by a system maintenance party, or may be modified and updated by a user. This is not limited herein.

In the non-volatile process file system 220, the process-related data may be stored in many different manners. For example, a manner the same as the virtual file system 210 may be used, a manner of a database may be used, or various manners of storing a file in an external memory may be used. This is not limited herein.

For example, in the non-volatile process file system 220, a general file system may be modified, and the process-related data may be stored by using a layout structure similar to that of the general file system. As shown in FIG. 3, the process-related data may be stored by using a layout structure of a superblock (Super Block) 221, a process control block node (PCB Node) 222, a page bitmap 223, and a persistent process file data block (Pages) 224.

The superblock 221 is a first block in the file system. This block stores structure information of the file system. For example, the superblock 221 records a size of each area, and the superblock 221 also stores information about an unused disk block.

The process control block node 222 is used to store a PCB of a process to uniquely identify a persistent process file. A function of the process control block is similar to that of inode in the general file system.

The page bitmap 223 is used to manage the persistent process file data block 224. The persistent process file data block 224 is split into several pages. A size of a page may be 4K. A usage status of the page (page) may be correspondingly represented by using the page bitmap 223.

The persistent process file data block 224 is used to store a most critical memory part and a process page table of a process. Finally, a persistent process file data block is constructed by using the process page table and a physical memory page used by the process.

It may be understood that such a layout structure is used in the non-volatile process file system 220 to store data related to a persistent process. After the data related to the persistent process is stored in the non-volatile process file system 220, the data related to the persistent process may be considered as a persistent process file. Different persistent process files are identified by using different process control blocks. Operations such as opening, accessing, modifying, backing up, and deleting may be performed on the persistent process file in a conventional file manner.

A daemon process 211 may run in the virtual file system 210, and is used to implement dynamic persistence of a persistent process. The daemon process 211 continuously runs, and cyclically detects a data link status of a process recorded in the to-be-persistent process list. A data page used by the process is found by using the page table of the process. An attempt is made to migrate the data page in the virtual file system 210 to the non-volatile process file system 220. If a page is frequently written, the page is kept in memory. When the page is not frequently written, the page is migrated to the non-volatile process file system 220.

In this manner, when the system is asleep or an unexpected power outage occurs, only a small quantity of frequently written pages that still exist in the virtual file system 210 need to be stored in the non-volatile process file system 220. In this case, there is no large amount of data that needs to be migrated, and key data in the memory is not lost. Therefore, a data page in the memory can be quickly backed up. When the system is woken up or restarted, because the data page of the process is stored in the non-volatile process file system 220 in the hybrid memory, the system can be directly woken up or restarted without data migration, to implement quick waking up or restarting of the system.

Figure 4:
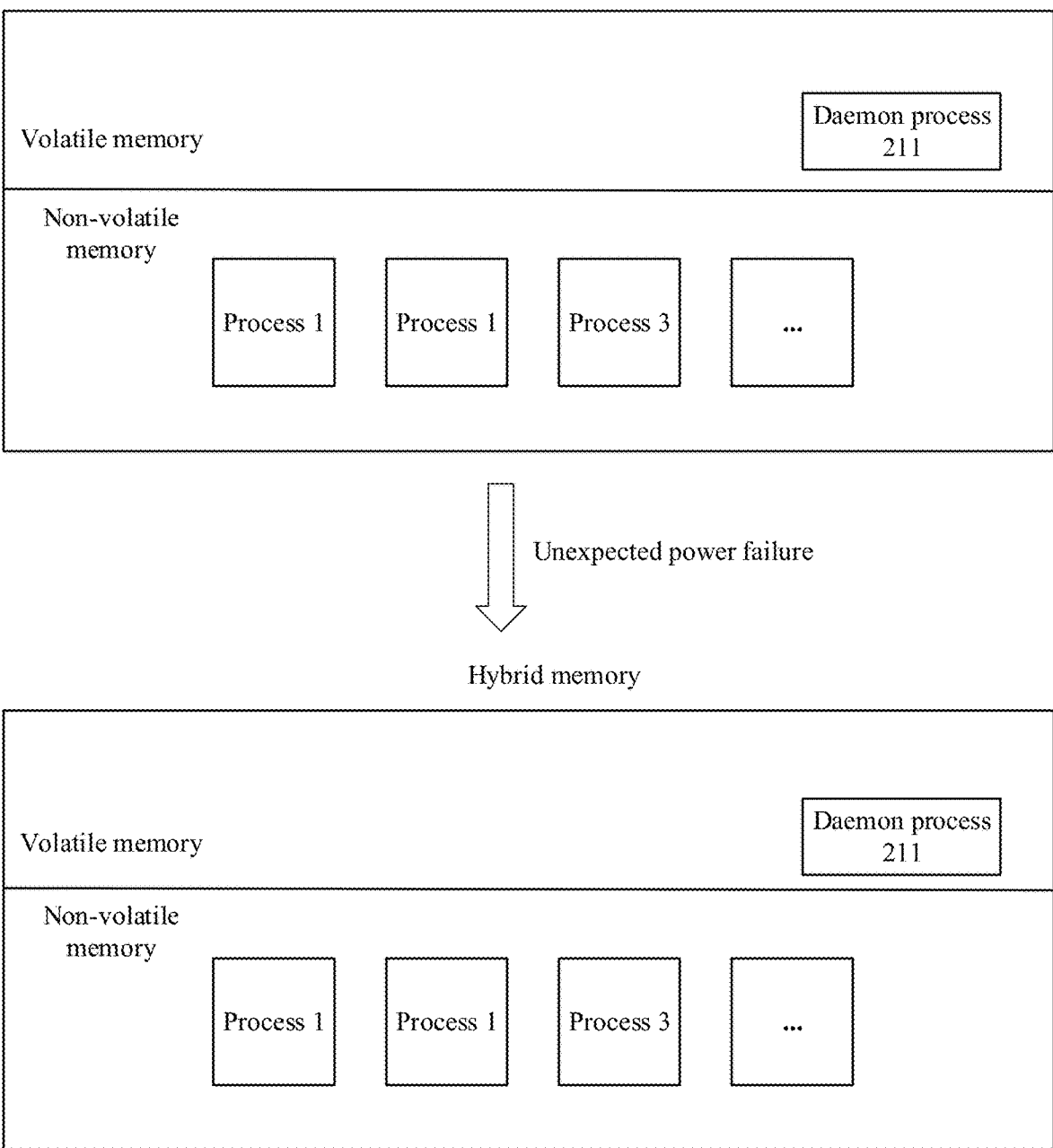
FIG. 4 is a diagram of an example scenario in which an unexpected power failure occurs in a system after a hybrid memory structure is used according to an embodiment of this application.

FIG. 4 is a diagram of an example scenario in which an unexpected power failure occurs in a system after a hybrid memory structure is used according to this application. When the system runs, the daemon process 211 in the hybrid memory migrates, to the non-volatile memory, data related to persistent processes such as a process 1, a process 2, and a process 3 that are recorded in the to-be-persistent process list, and performs linking to a process linked list for further running. After the unexpected power failure, the data related to these persistent processes in the non-volatile memory is not lost. When the system is restarted, the data related to these persistent processes may be directly linked to the process linked list for continuous running of these persistent processes. In this way, the system can be quickly restarted.

With reference to the foregoing example hardware structure and hybrid memory structure of the electronic device 100, the following describes the process management method in embodiments of this application by using, as an example, a process in which a temporary power failure occurs in the system when a persistent process in the to-be-persistent process list is running after the system is started.

Figure 5A:
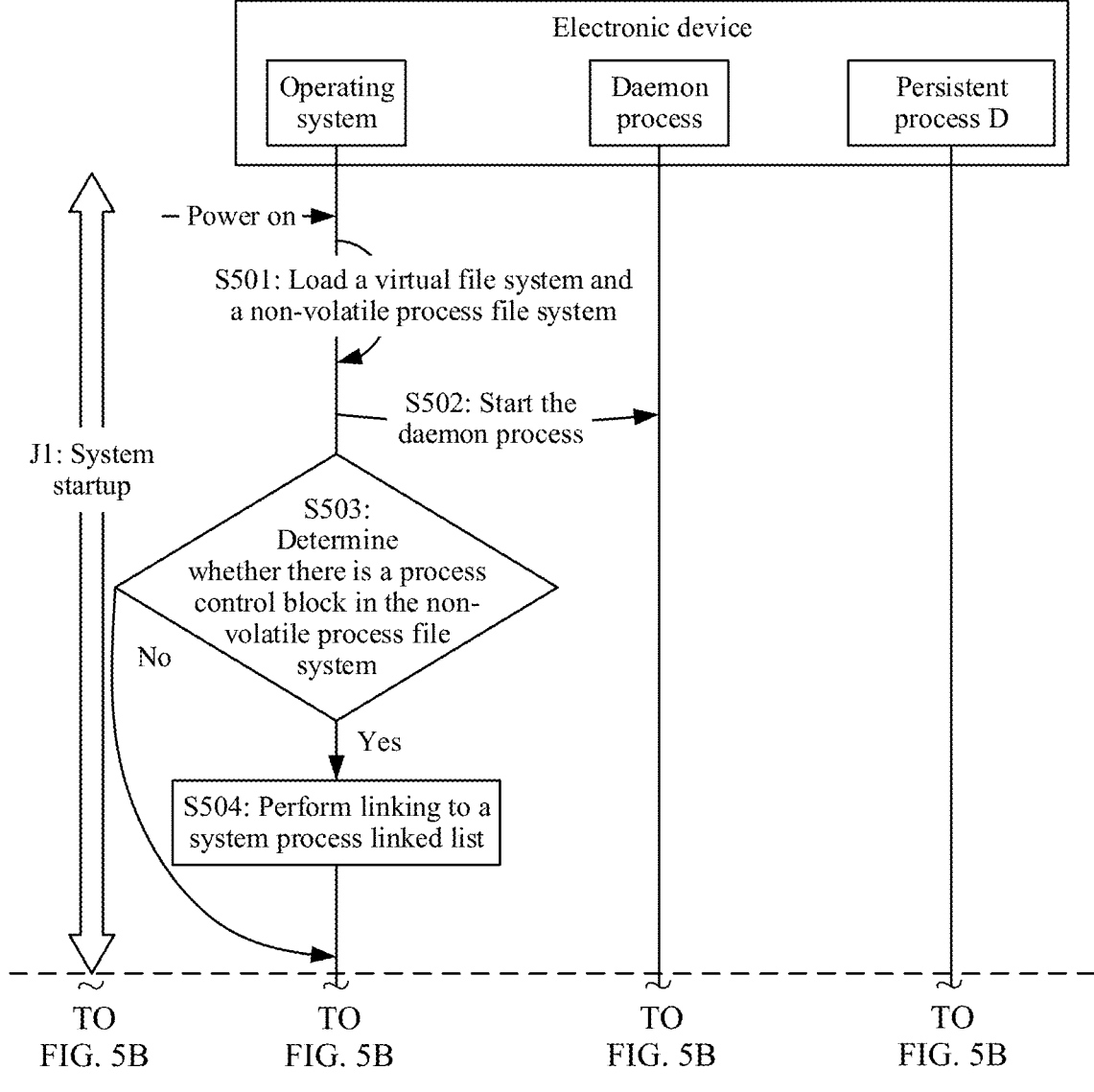
FIG. 5A and FIG. 5B are a schematic flowchart of an example of a process management method according to an embodiment of this application.
Figure 5B:
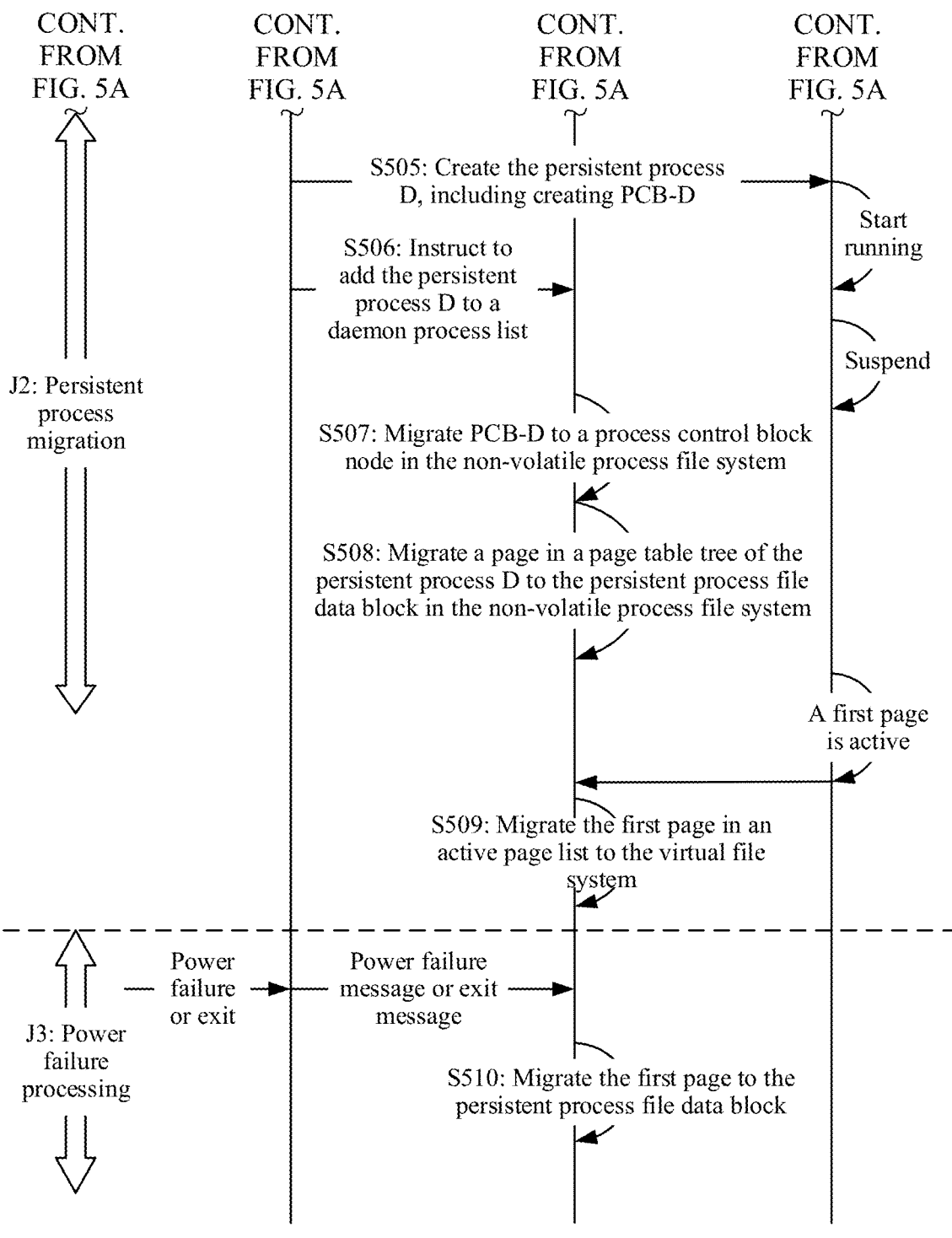

FIG. 5A and FIG. 5B are a schematic flowchart of an example of a process management method according to an embodiment of this application.

For ease of understanding, the schematic flowchart shown in FIG. 5A and FIG. 5B is divided into the following five phases for description:

J1: System startup phase. A system startup process is described.

J2: Persistent process migration phase. A process of migrating data related to a persistent process D from a volatile memory to a non-volatile memory is described by using an example in which the persistent process D in a to-be-persistent process list starts running.

J3: Power failure processing phase. A processing procedure of a system during a temporary power failure is described by using a first page of the persistent process D as an example.

The following separately describes a procedure of each phase in detail.

The J1 system startup phase includes steps S501 to S504.

S501: Load a virtual file system and a non-volatile process file system.

After being powered on, an operating system of an electronic device may read registered file systems that include the virtual file system 210 in the volatile memory and the non-volatile process file system 220 in the non-volatile memory. The operating system can load the two registered file systems: the virtual file system and the non-volatile process file system.

S502: Start a daemon process.

After loading the virtual file system in the volatile memory, the operating system may start the daemon process.

In some embodiments, the operating system may read data related to the daemon process and store the data in the virtual file system for running. In some other embodiments, the data related to the daemon process may be not stored in the virtual file system, but stored in another storage area of the volatile memory or in the non-volatile memory for running. This is not limited herein.

S503: Determine whether there is a process control block in the non-volatile process file system.

After starting the daemon process and loading the non-volatile process file system, the operating system may read a superblock of the non-volatile process file system, and determine whether there is a process control block (PCB) in the non-volatile process file system.

If the layout structure shown in FIG. 3 is used in the non-volatile process file system, the superblock stores structure information of the file system, and also stores information indicating whether a disk block is used. Therefore, in an implementation, whether there is a process control block in the non-volatile process file system can be determined by determining only whether a disk block corresponding to a process control block node 222 (PCB node) in the non-volatile process file system is used.

It may be understood that there may be another manner of determining whether there is a process control block in the non-volatile process file system. For example, the superblock may include a dedicated flag bit used to identify whether there is a process control block in the non-volatile process file system. This is not limited herein.

For example, before the power outage occurs in the operating system for a previous time, if the daemon process migrates process control blocks of some persistent processes to the non-volatile process file system of the non-volatile memory, and does not actively delete data of these processes before the power outage. In this case, after the operating system is powered on in this time, the process control blocks of these persistent processes should be still stored in the non-volatile process file system. Therefore, the operating system can detect that there is a process control block in the non-volatile process file system.

For example, if the electronic device is a newly delivered electronic device, or before the power outage occurs in the operating system in the previous time, the daemon process does not migrate a process control block of any persistent process to the non-volatile process file system of the non-volatile memory. In this case, after the operating system is powered on in this time, the operating system cannot detect any process control block in the non-volatile process file system. In other words, the operating system determines that there is no process control block in the non-volatile process file system.

When the operating system determines that there is a process control block in the non-volatile process file system, that is, the non-volatile process file system stores data related to a process corresponding to the process control block, step 504 may be triggered to be performed to directly link the process control block to a system process linked list.

When the operating system determines that there is no process control block in the non-volatile process file system, that is, the non-volatile process file system does not store process-related data, the operating system may directly perform subsequent steps without performing step S504.

S504: Link the process control block in the non-volatile process file system to the system process linked list.

When the operating system determines that there is a process control block in the non-volatile process file system, the operating system may obtain the system process linked list, traverse all process control blocks stored in the non-volatile process file system, and link all these process control blocks to the system process linked list.

It may be understood that the system process linked list may be a doubly linked list including a plurality of PCBs. One PCB may include a previous pointer (prev_task) pointing to a previous PCB in the system process linked list, a next pointer (next_task) pointing to a next PCB in the system process linked list, memory management information; and may further include a process identifier, a process status, and the like corresponding to the PCB. This is not limited herein.

The memory management information in the PCB indicates memory information used by the process, and may point to a structure referred to as a memory descriptor (mm-struct). Herein, mm-struct may include a pointer of a page global directory (PGD) established for the process corresponding to the PCB. The PGD may include page upper directories (PUDs). The PUD may further include page middle directories (PMDs). The PMD further includes addresses of page tables (PT). One PT has page table entries (PTEs). One PTE points to one page frame (physical memory page).

Figure 6:
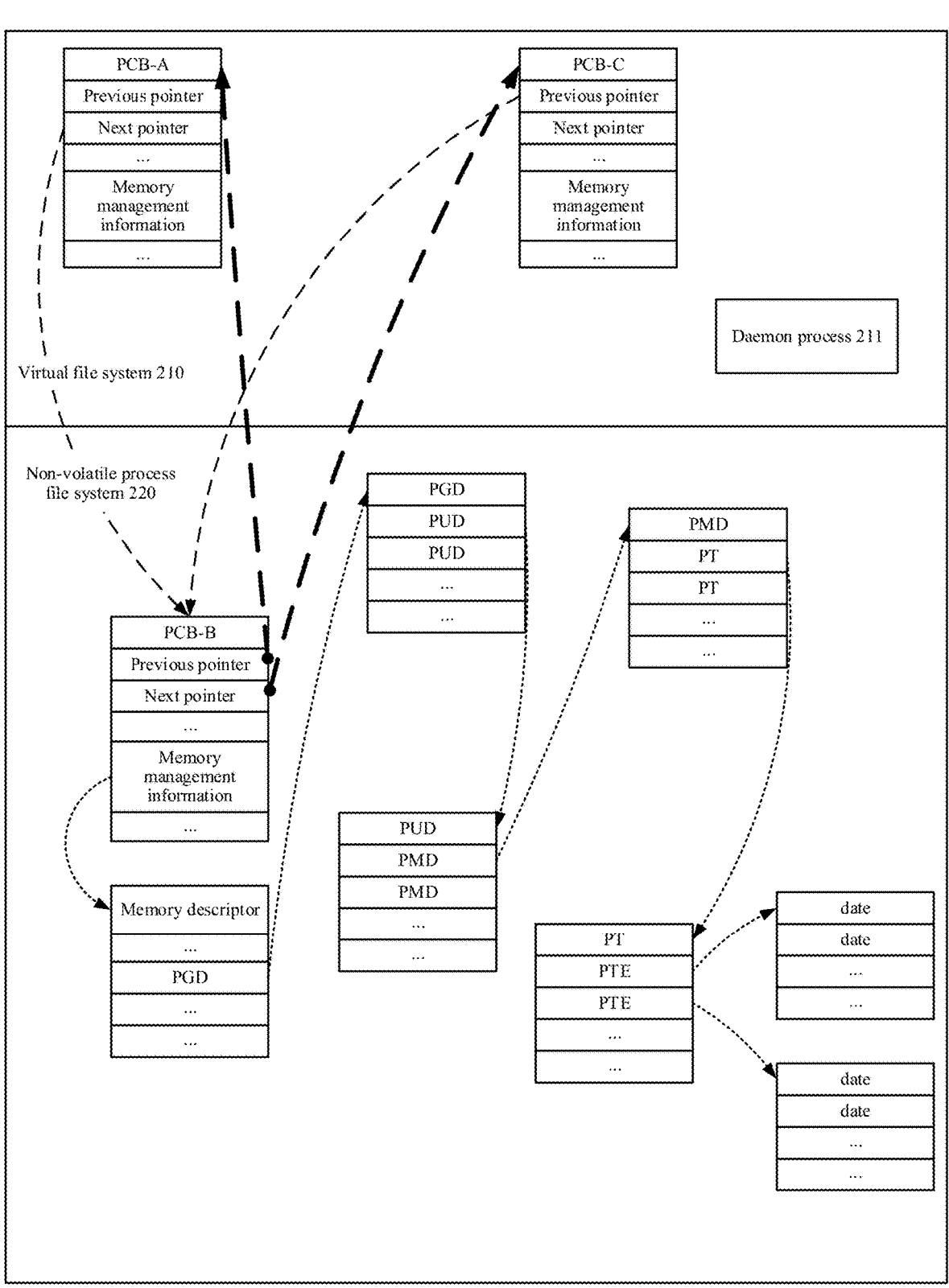
FIG. 6 is a diagram of an example scenario in which a process control block in a process control block node is linked to a system process linked list according to an embodiment of this application.

For example, as shown in FIG. 6, it is assumed that the process control block node 222 in the non-volatile process file system stores a process control block (PCB-B) of a process B and a memory descriptor of the process B. The memory descriptor includes a pointer pointing to a PGD. The PGD includes a plurality of PUDs. Each PUD includes a plurality of PMDs. Each PMD includes a plurality of PTs. Each PT includes a plurality of PTEs. One PTE is one physical memory page of the process. Process page tables of the process B such as the PGD, the PUD, the PMD, and the PT and these physical memory pages that are used by the process B and that are pointed to by the PTEs in the PT are all stored in a persistent process file data block 224 in the non-volatile process file system.

The system process linked list generated in the virtual file system 210 when the operating system is started includes a process control block (PCB-A) of a process A and a process control block (PCB-C) of a process C. In this case, when the operating system determines that there is a process control block in the non-volatile process file system, the operating system may obtain the system process linked list, and traverse the non-volatile process file system to obtain PCB-B. If the operating system determines, based on a running relationship between processes, that PCB-B should be between PCB-A and PCB-C in the system process linked list, the operating system may link PCB-B to the system process linked list. This includes changing a previous pointer (prev_task) of PCB-B to point to PCB-A, and changing a next pointer (next_task) of PCB-B to point to PCB-C. Correspondingly, a next pointer of PCB-A is changed to point to PCB-B, and a previous pointer (prev_task) of PCB-C is also changed to point to PCB-B.

In this way, a process control block in the non-volatile process file system can be linked to the system process linked list by changing only a pointer of each PCB, and data of a memory does not need to be migrated or reconstructed. This greatly improves a startup speed of the system.

In some embodiments, after linking the process control block in the non-volatile process file system to the system process linked list, the operating system may further add the process corresponding to the process control block to a daemon process list. The daemon process list is used to record a currently running persistent process. The daemon process 211 may perform real-time memory migration on a currently running persistent process based on the daemon process list. For details, refer to the following description of the J2 persistent process migration phase. Details are not described herein.

In steps S503 and S504 in the foregoing embodiment, when determining that there is no process control block in the non-volatile process file system, the operating system may directly perform subsequent steps without performing step S504. In some embodiments, when the system is started, if there is no process control block in the non-volatile process file system, the operating system may first prompt the user whether to format the non-volatile process file system.

After receiving a formatting instruction, the operating system may format the non-volatile process file system by establishing a superblock 221 in a preconfigured address range of the non-volatile process file system, and emptying an area of the process control block node 222 and an area of a page bitmap 223. In some embodiments, a backup superblock may also be established. This is not limited herein.

In some embodiments, when there is no process control block in the non-volatile process file system, the operating system may directly format the non-volatile process file system without user selection.

After the operating system completes formatting of the non-volatile process file system, or receives an instruction of skipping formatting the non-volatile process file system, the operating system may directly perform subsequent steps without performing step S504.

It may be understood that it is possible that no persistent process is running before the previous power outage or the daemon process does not have enough time to migrate a persistent process to the non-volatile process file system, it is also possible that the electronic device is a newly delivered device and has not been formatted to generate the non-volatile process file system, and it is more possible that an error occurs in the non-volatile process file system and therefore a process control block cannot be stored or a stored process control block is lost. As a result, there is no process control block in the non-volatile process file system of the electronic device. In the following two possibilities, the non-volatile process file system needs to be formatted, to ensure normal running of the non-volatile process file system. Therefore, the non-volatile process file system is formatted when there is no process control block in the non-volatile process file system, to ensure normal running of the non-volatile process file system while ensuring security of data of the memory.

The J2 persistent process migration phase includes steps S505 to S509.

S505: Create a persistent process D, including creating PCB-D.

The electronic device stores a to-be-persistent process list. A process recorded in the to-be-persistent process list may be referred to as a persistent process. The to-be-persistent process list may be built in the electronic device 100 before delivery, or may be pushed by a system maintenance party, or may be updated by a system maintenance party, or may be modified and updated by a user. This is not limited herein.

After the operating system is started, the persistent process D may be created based on a user operation or a running requirement of another process. This includes creating a process control block (PCB-D) of the persistent process D, a related page table, and a physical memory page.

When the persistent process D is just created and starts running, process-related data (PCB-D, the related page table, and the physical memory page) is all stored in the virtual file system 210.

S506: The operating system instructs the daemon process to add the persistent process D to the daemon process list.

After the operating system starts the process D, if it is determined that the process D is a process in the to-be-persistent process list, that is, the process D is a persistent process, the operating system may instruct the daemon process to add the persistent process D to the daemon process list. The daemon process list is used to record a currently running persistent process.

The daemon process 211 may perform subsequent steps based on the daemon process list, to migrate data related to the persistent process D from the virtual file system 210 to the non-volatile process file system 220 in real time.

S507: Migrate PCB-D to the process control block node in the non-volatile process file system.

For the persistent process D that is newly added to the daemon process list, the daemon process 211 may migrate PCB-D of the persistent process D to the process control block node in the non-volatile process file system.

It may be understood that, in this embodiment of this application, migrating PCB-D from the virtual file system 210 to the non-volatile process file system 220 includes directly transferring data of PCB-D from the virtual file system 210 to the non-volatile process file system 220, and further includes after the transfer, modifying a previous pointer and a next pointer related to PCB-D in the system process linked list. In this way, after the migration, PCB-D is kept in a state of being linked to the system process linked list. For a specific process of modifying the previous pointer and the next pointer, refer to an example diagram shown in FIG. 6.

PCB-D is migrated from the virtual file system 210 to the process control block node 222 of the non-volatile process file system 220, to implement establishment of the system process linked list across media (a volatile memory and non-volatile memory). A file system and memory management are integrated. When a process is still in the memory, data of the process in the non-volatile memory is managed by using a structured file system, and the process data is quickly stored in a file without affecting normal running of the process in the memory. In addition, a process control block is used as a main structure of a process in a file system of the non-volatile memory, and process data is managed in the non-volatile memory in a structure form of a common file, to facilitate direct reading and using of the process data stored in the non-volatile memory.

In some embodiments of this application, when data of PCB-D is transferred from the virtual file system 210 to the non-volatile process file system 220, the following manner may be used: first copying the data of PCB-D to the process control block node 222 of the non-volatile process file system 220; when it is determined that the process is suspended, linking PCB-D in the non-volatile process file system 220 to the system process linked list; and then deleting redundant data corresponding to PCB-D in the virtual file system 210.

For example, FIG. 7a to FIG. 7d are diagrams of an example scenario of migrating related data of a persistent process D to a non-volatile process file system.

Figure 7A:
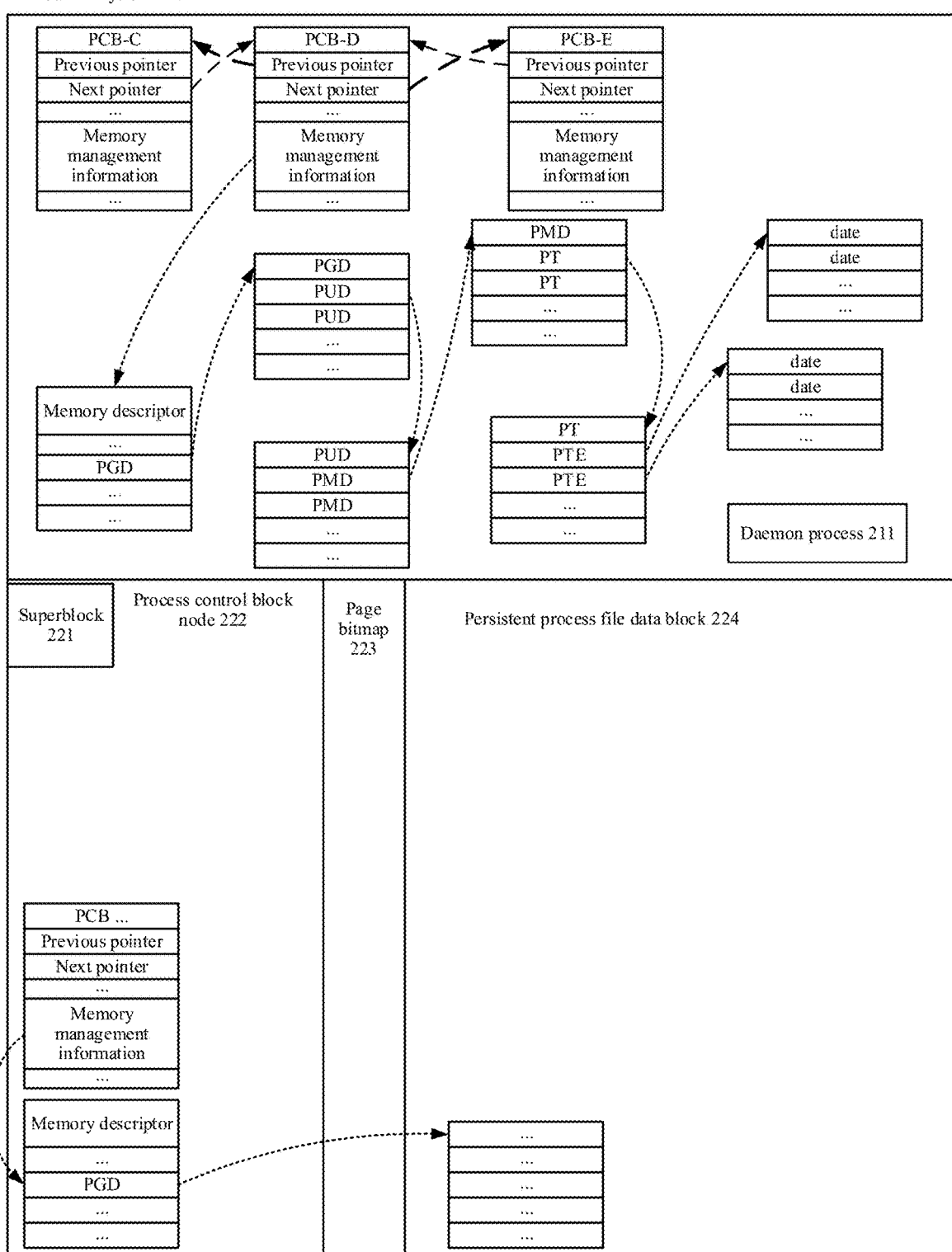
FIG. 7a to FIG. 7d are diagrams of an example scenario of migrating related data of a persistent process D to a non-volatile process file system according to an embodiment of this application.

As shown in FIG. 7a, after the persistent process D is created, the related data of the persistent process D is stored in the virtual file system 210, and PCB-D is a state of linking to the system process linked list. In the state, PCB-D is separately linked to PCB-C before PCB-D and PCB-E after PCB-D. The non-volatile process file system 220 may also store data related to some other persistent processes (for example, data related to the process B shown in FIG. 6). These stored data related to these persistent processes are also linked to the system process linked list (this is not shown in the figure for simplicity of description). In some embodiments, in this case, the non-volatile process file system 220 may not store data related to another process. This is not limited herein.

Figure 7B:
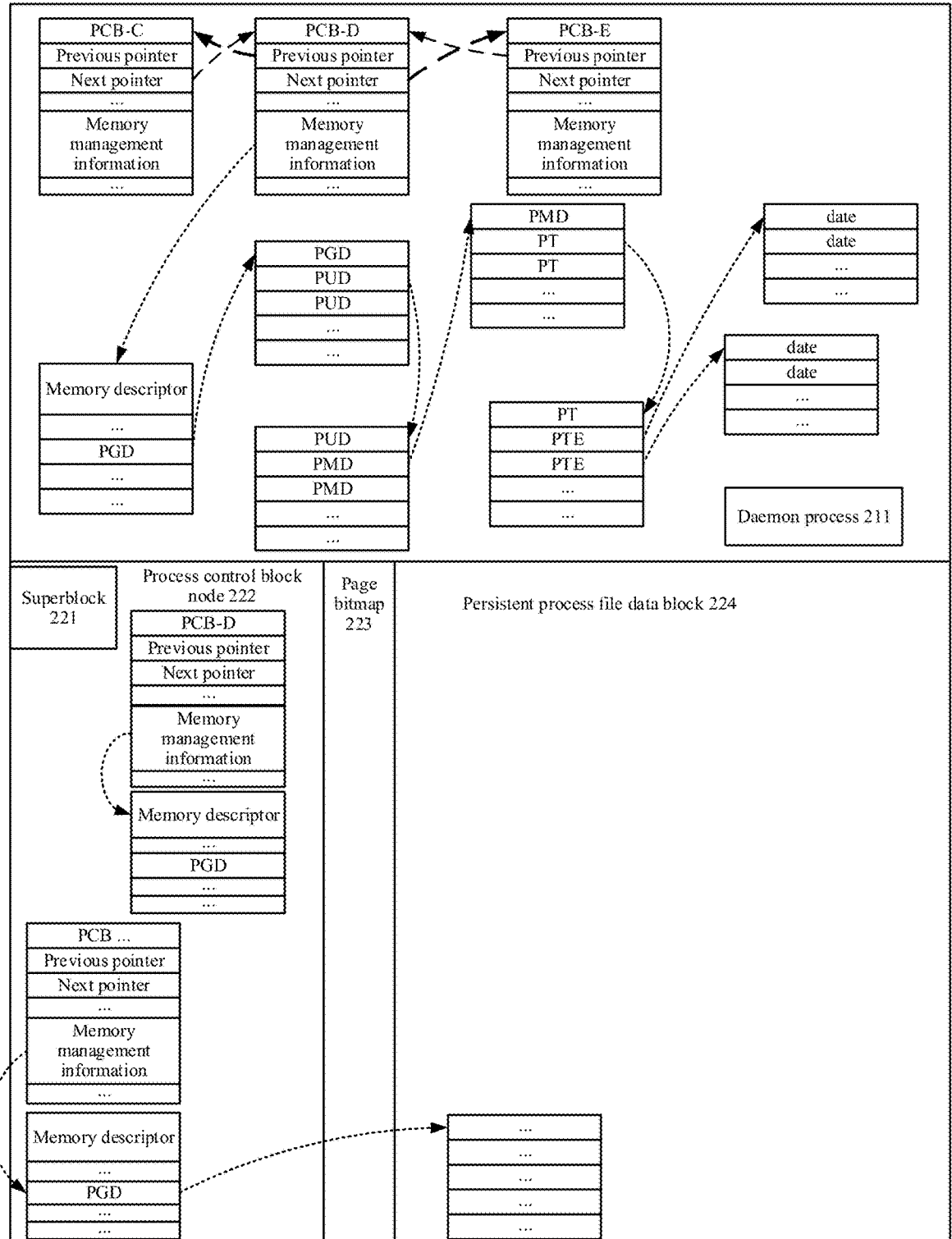

After the daemon process adds the persistent process D to the daemon process list, as shown in FIG. 7b, PCB-D in the virtual file system 210 may be first copied to the process control block node 222 of the non-volatile process file system 220. In some embodiments, the memory descriptor to which the memory management information points may also be simultaneously copied to the process control block node 222.

Figure 7C:
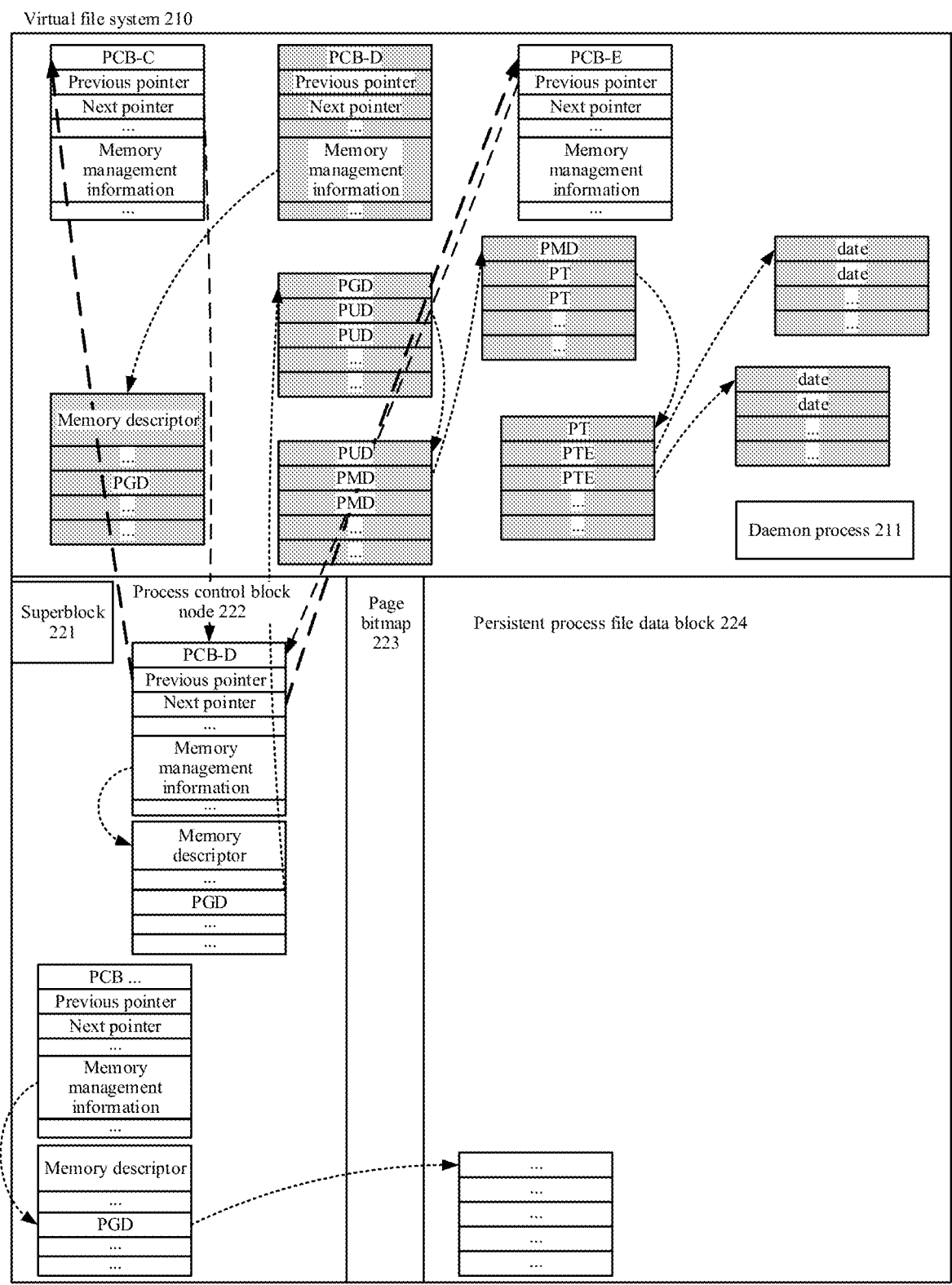

As shown in FIG. 7c, when it is determined that the persistent process D is suspended, PCB-D in the process control block node 222 may be linked to the system process linked list by modifying the related pointer.

Figure 7D:
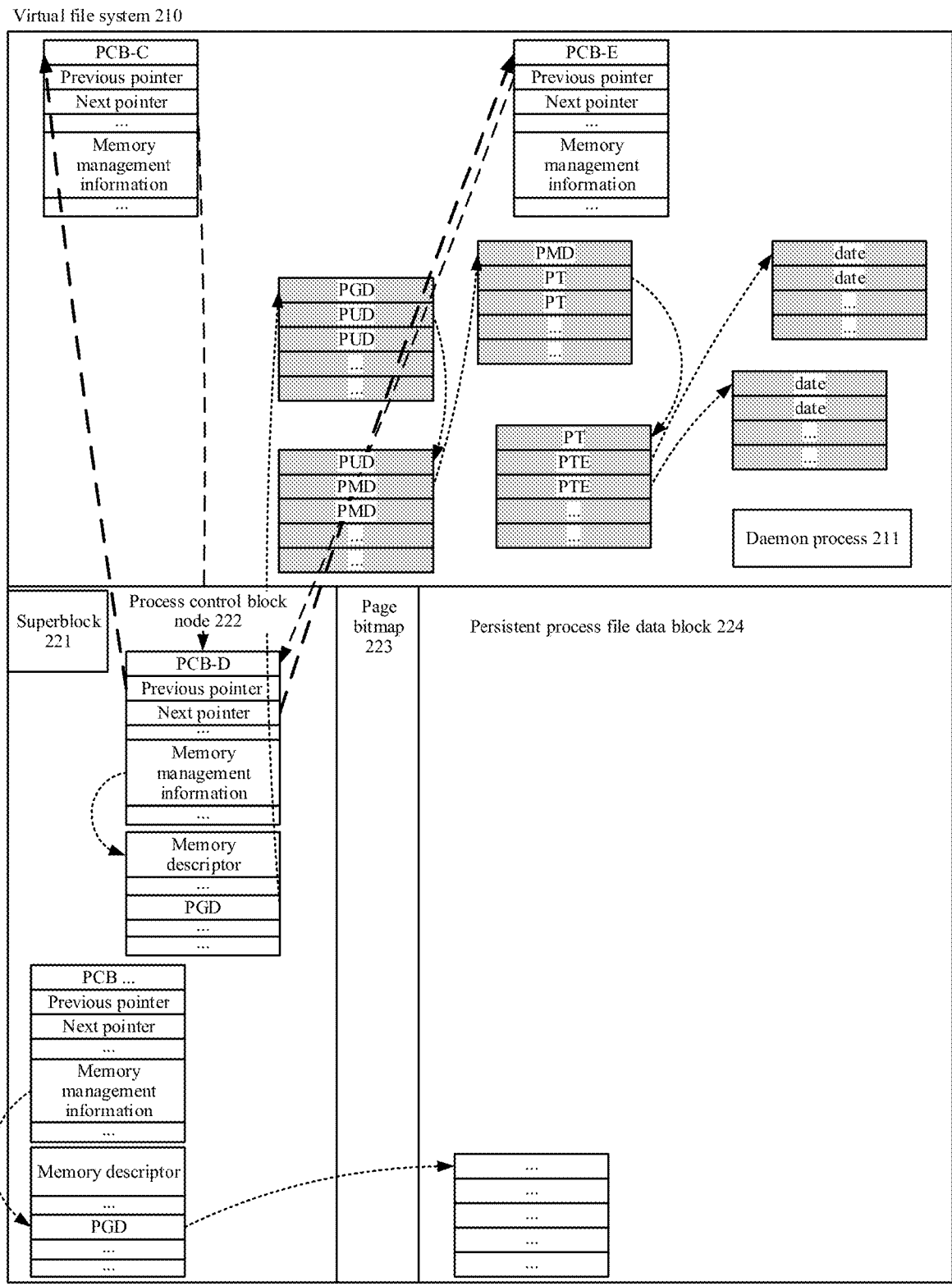

As shown in FIG. 7d, after PCB-D in the process control block node 222 is linked to the system process linked list, redundant data (PCB-D and a memory descriptor) corresponding to the PCB-D in the virtual file system 210 may be deleted.

In this way, it can be ensured that the migration process does not affect normal running of the persistent process D, and security of migrated data can be ensured. Before PCB-D in the non-volatile process file system 220 is linked to the system process linked list, PCB-D in the virtual file system 210 is equivalent to a backup file of the migrated data. Even if a data processing error occurs in the migration process, the migrated data may be discarded, and then PCB-D may be directly copied from the virtual file system 210 to the non-volatile process file system 220 again.

In some embodiments of this application, alternatively, the PCB in the virtual file system 210 may be directly cut to the non-volatile process file system 220, to save space of the virtual file system 210 in the migration process. This is not limited herein.

S508: Migrate a page in a page table tree of the persistent process D to the persistent process file data block in the non-volatile process file system.

After migrating PCB-D to the process control block node in the non-volatile process file system, the daemon process may migrate the page in the page table tree of the persistent process D to the persistent process file data block in the non-volatile process file system.

It should be noted that the electronic device may store an active page list that records an active page in a page table tree of a currently running process. The page recorded in the active page list is updated in real time as the operating system runs. The page recorded in the active page list may be referred to as an active page. A page not recorded in the active page list may be referred to as an inactive page. Usually, each page recorded in the active page list corresponds to active timing. After active timing of an active page ends, the active page changes to an inactive page and is deleted from the active page list. If the inactive page needs to be frequently accessed again, the inactive page may be added to the active page list and marked as an active page. A specific manner of determining when to add an inactive page to the active page list varies according to an actual setting. For example, a quantity of interrupts that occur in reading/writing a page may be calculated. Details are not described herein.

It may be understood that, if all pages in the page table tree of the persistent process D are inactive pages, all the pages in the page table tree of the persistent process D may be directly migrated to the persistent process file data block. If there is an active page in the pages in the page table tree of the persistent process D, the daemon process may first migrate all inactive pages to the persistent process file data block, and wait until active timing of the active page ends and the active page changes to an inactive page, then migrate these inactive pages to the persistent process file data block, to complete migration of the pages in the page table tree of the persistent process D.

It may be understood that, in this embodiment of this application, migrating the page in the page table tree of the persistent process D from the virtual file system to the persistent process file data block includes moving data of the page to the persistent process file data block, and further includes linking, to the page table tree of the persistent process D by modifying a pointer, the page moved to the persistent process file data block.

Figure 8:
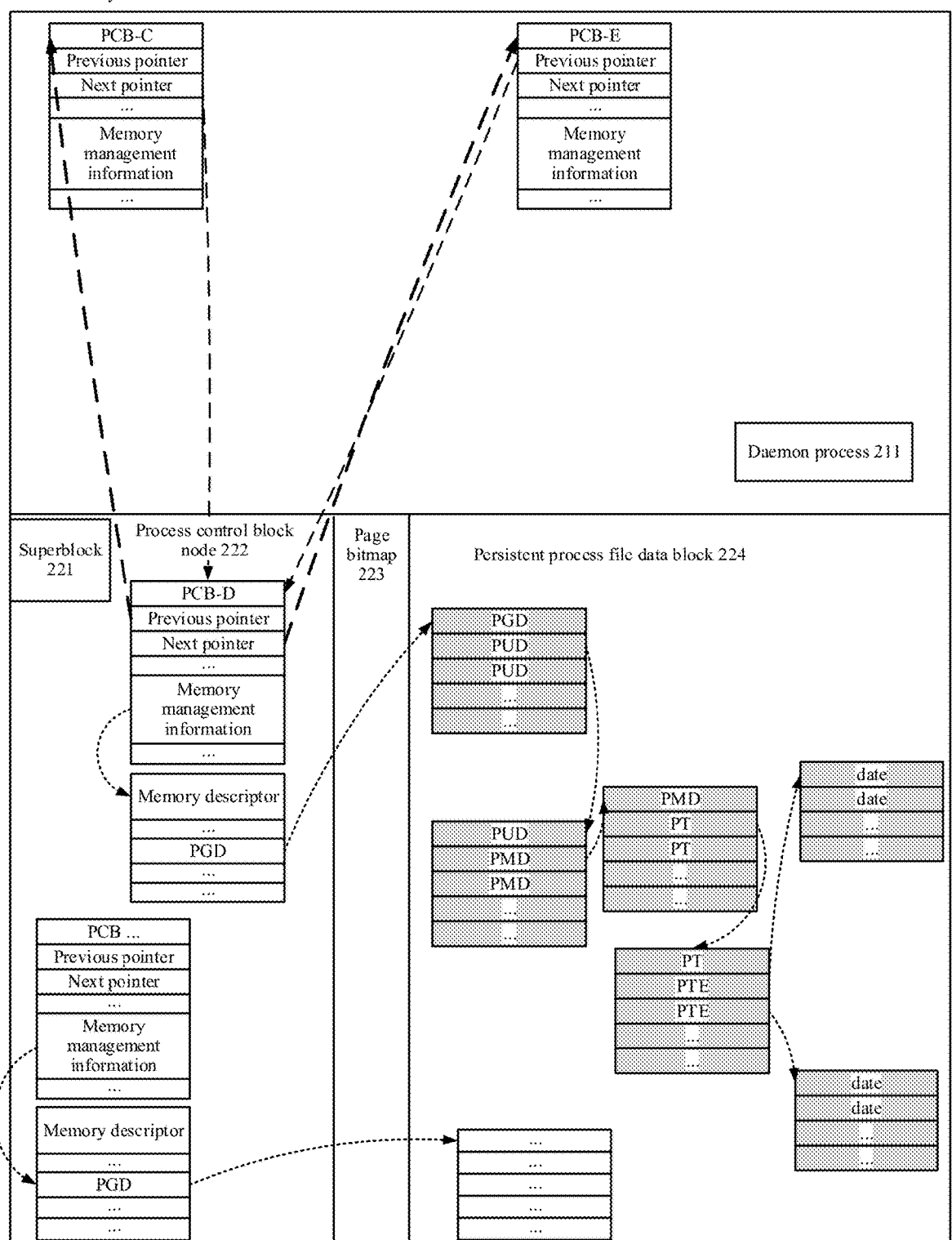
FIG. 8 is a diagram of an example scenario of migrating a page in a page table tree of a persistent process D to a persistent process file data block according to an embodiment of this application.

For example, FIG. 8 is a diagram of an example scenario of migrating a page in a page table tree of a persistent process D to a persistent process file data block. After the page in the page table tree of the persistent process D is moved to the persistent process file data block 224, each page table pointer is modified to link the page to the page table tree of the persistent process D.

It should be noted that a reason why the pointer needs to be modified before the page is linked to the page table tree is that a physical memory address for storing the page changes after the page is moved to the persistent process file data block for storage.

In the foregoing embodiment, in a running process of the operating system, if a created process is a persistent process recorded in the to-be-persistent process list, the process may be added to the daemon process list. The daemon process migrates, to the non-volatile process file system in real time, the data related to the persistent process in the daemon process list. In this way, even if an accident such as a temporary power failure occurs, the data related to the currently running persistent process is not lost, and can be directly recovered when the system is restarted or woken up. This improves security of process data in the memory and improves a restart or wakeup speed.

In some embodiments, the operating system may directly read and write the page migrated to the persistent process file data block.

In some embodiments, after migrating the page to the persistent process file data block, the daemon process may set the page to read-only. When page data needs to be updated, an interrupt notification is generated to notify the daemon process or the operating system.

In some embodiments, if frequency at which a specific page needs to be updated is low, the daemon process or the operating system may directly change the page to writable in the persistent process file data block, and may directly update data of the page in the persistent process file data block.

In some embodiments, if frequency at which a specific page in the persistent process file data block needs to be updated is high, the page may be added to the active page list, the page is marked as an active page, and step S509 is performed.

S509: Migrate a first page in the active page list to the virtual file system.

When a first page in the page table tree of the persistent process D is active, and the daemon process or the operating system adds the first page to the active page list and marks the first page as an active page, the daemon process may migrate the first page to the virtual file system 210, to quickly update the first page.

Figure 9:
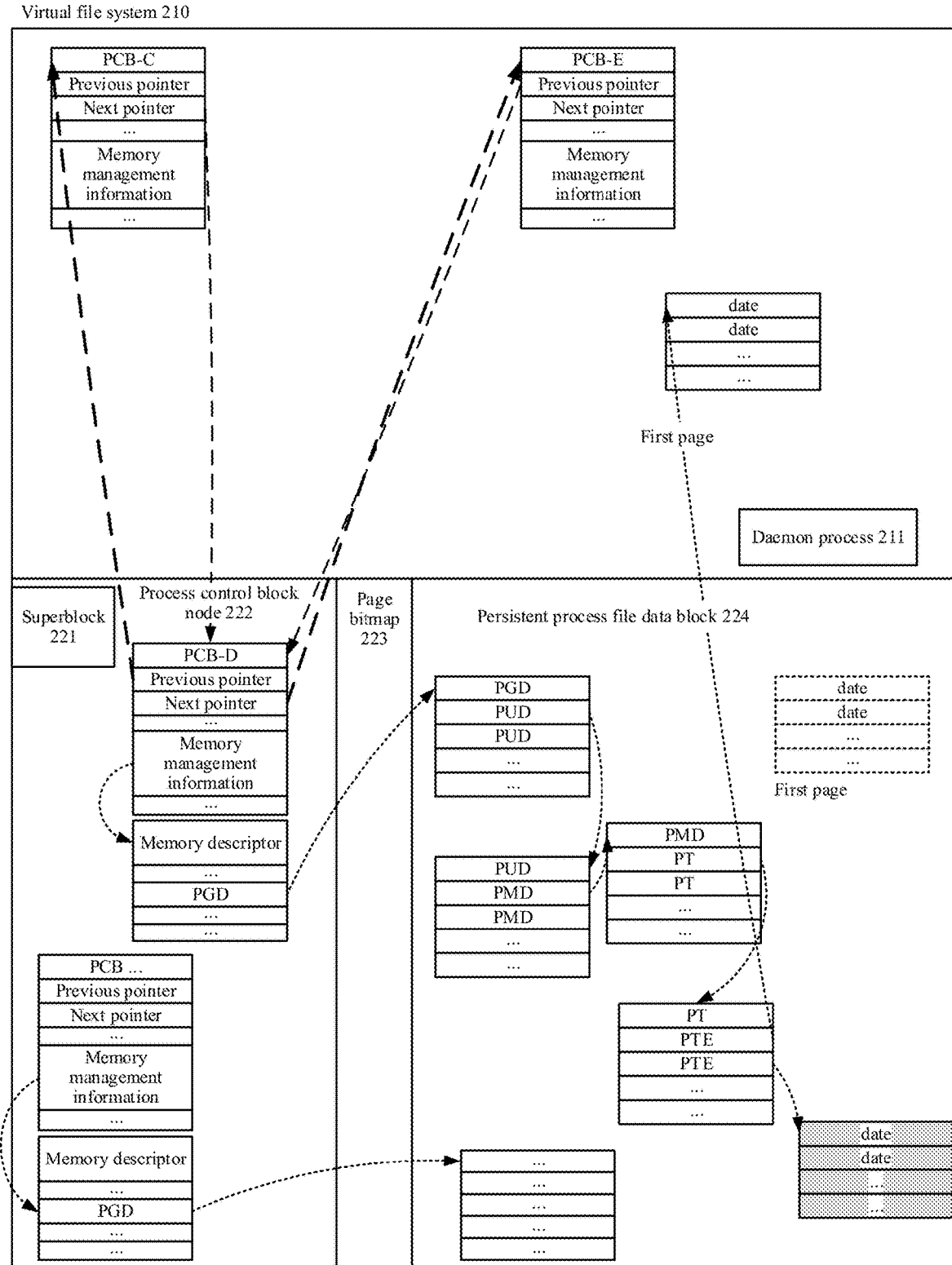
FIG. 9 is a diagram of an example scenario of migrating a first page in a page table tree of a persistent process D from a persistent process file data block to a virtual file system according to an embodiment of this application.

For example, FIG. 9 is a diagram of an example scenario of migrating the first page in the page table tree of the persistent process D from the persistent process file data block 224 to the virtual file system 210. After the first page changes to an active page, data of the first page may be transferred to the virtual file system 210, and linked to the page table tree of the persistent process D. Another page in the page table tree of the persistent process D may be still stored in the persistent process file data block 224. In this way, data update may be directly performed on the active first page in the virtual file system 210.

In this way, a page table and data of the page table are directly linked across media, and the volatile memory and the persistent process file data block are further integrated, to implement quick update of the process data while normal running of the process and storage security are ensured.

The J3 power failure processing phase includes step S510.

S510: When the daemon process receives a power failure message or an exit message, the daemon process migrates the first page to the persistent process file data block.

When the daemon process receives the power failure message or the exit message, if the first page in the page table tree of the persistent process D is still in the virtual file system, the daemon process may migrate the first page to the persistent process file data block.

Figure 10:
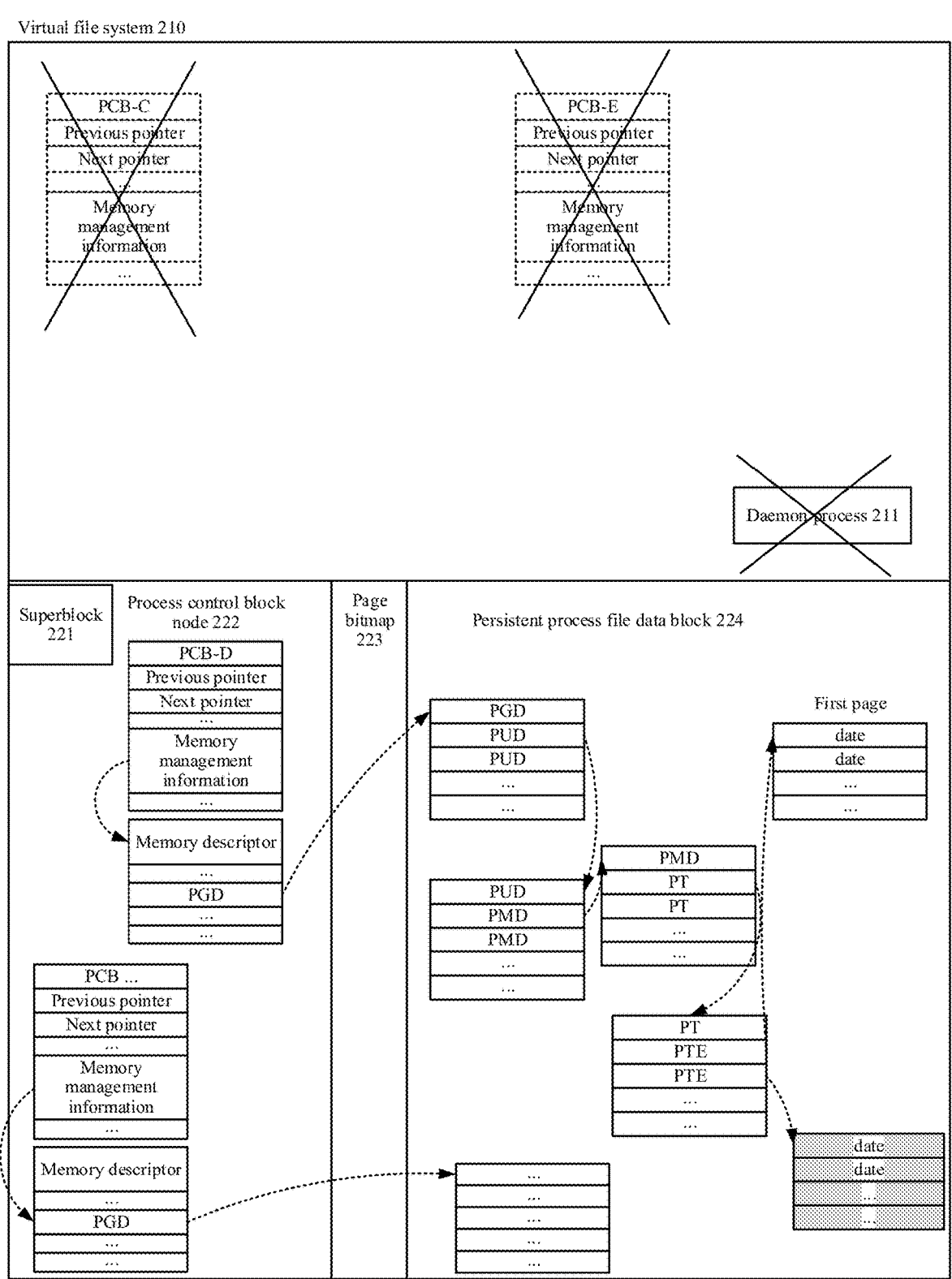
FIG. 10 is a diagram of an example scenario of migrating a first page from a virtual file system to a persistent process file data block in a case of a temporary power failure according to an embodiment of this application.

For example, FIG. 10 is a diagram of an example scenario of migrating the first page from the virtual file system 210 to the persistent process file data block 224 in a case of a temporary power failure. When receiving the power failure message or the exit message, the daemon process migrates the first page to the persistent process file data block 224. However, data related to some non-persistent processes (usually less important processes) that are in the virtual file system 210 but are not in the to-be-persistent process list is lost.

In some embodiments, after the daemon process receives the power failure message or the exit message and migrates the virtual file system 210 to the persistent process file data block 224, the operating system may further exit the daemon process, and notify the file system. This is not limited herein.

It may be understood that, even in a case of a temporary power outage, because the electronic device includes a component such as a capacitor, there is a relatively short time interval at a millisecond level between the power outage of the electronic device and an actual power failure of the system. The short time interval cannot support transferring a large amount of process data in the memory from the memory to the external memory in the conventional technologies. However, in this embodiment of this application, in the data related to the persistent process in the daemon process list, only a small amount of data of an active page recorded in the active page list is still stored in the virtual file system 210. Therefore, in this short time interval, the daemon process needs to migrate only data of these active pages (for example, the first page) to the persistent process file data block. This can be completed in most cases. Therefore, in this embodiment of this application, even in the case of a temporary power outage, complete data of a persistent process can be stored. When the system is restarted, a pointer can be directly modified to implement linking to the system process list, thereby implementing quick recovery of the system.

In this embodiment of this application, in a running process, a process may be dynamically migrated to the non-volatile memory to implement persistence, and the system process linked list and the data page table may be maintained across media. When sleep is needed or a temporary power failure occurs, very little dynamic data needs to be stored in the volatile memory, and non-persistent data in the volatile memory can be quickly stored in the non-volatile memory within a short time interval of the temporary power failure, so that data is more secure. However, when the electronic device is started or woken up, only the pointer is modified to link the process in the non-volatile memory to the system process list, so that running of the system can be resumed. A wakeup process is extremely quick.

In addition, in this embodiment of this application, the non-volatile process file system 220 formed by using the layout structure shown in FIG. 3 is used in the non-volatile memory to store the data related to the persistent process. In this way, the data related to the persistent process forms a persistent process file, and the persistent process file can be opened and accessed in a conventional file manner, with no need to perform parsing and reconstruction, so that operation and maintenance personnel can analyze a running status of a process or extract key data when the process cannot work normally.

In some embodiments, because the persistent process file stored in the non-volatile process file system 220 may be backed up periodically, when the electronic device cannot be recovered due to a serious hardware or software fault, a backup persistent process file may be used for recovery to implement a quick running withdrawal.

In some embodiments, when the electronic device needs to be replaced or upgraded due to a fault, the persistent process file in the original electronic device may be directly copied to a non-volatile process file system in a hybrid memory of a new electronic device, to recover the running status of the process and the dynamic data before the fault occurs, thereby improving a recovery speed for a fault to the greatest extent and reducing a loss caused due to the fault.

It may be understood that the phases in the foregoing example flowchart may be respectively used as an independent embodiment, or may be combined into another embodiment. This is not limited herein.

Figure 11A:
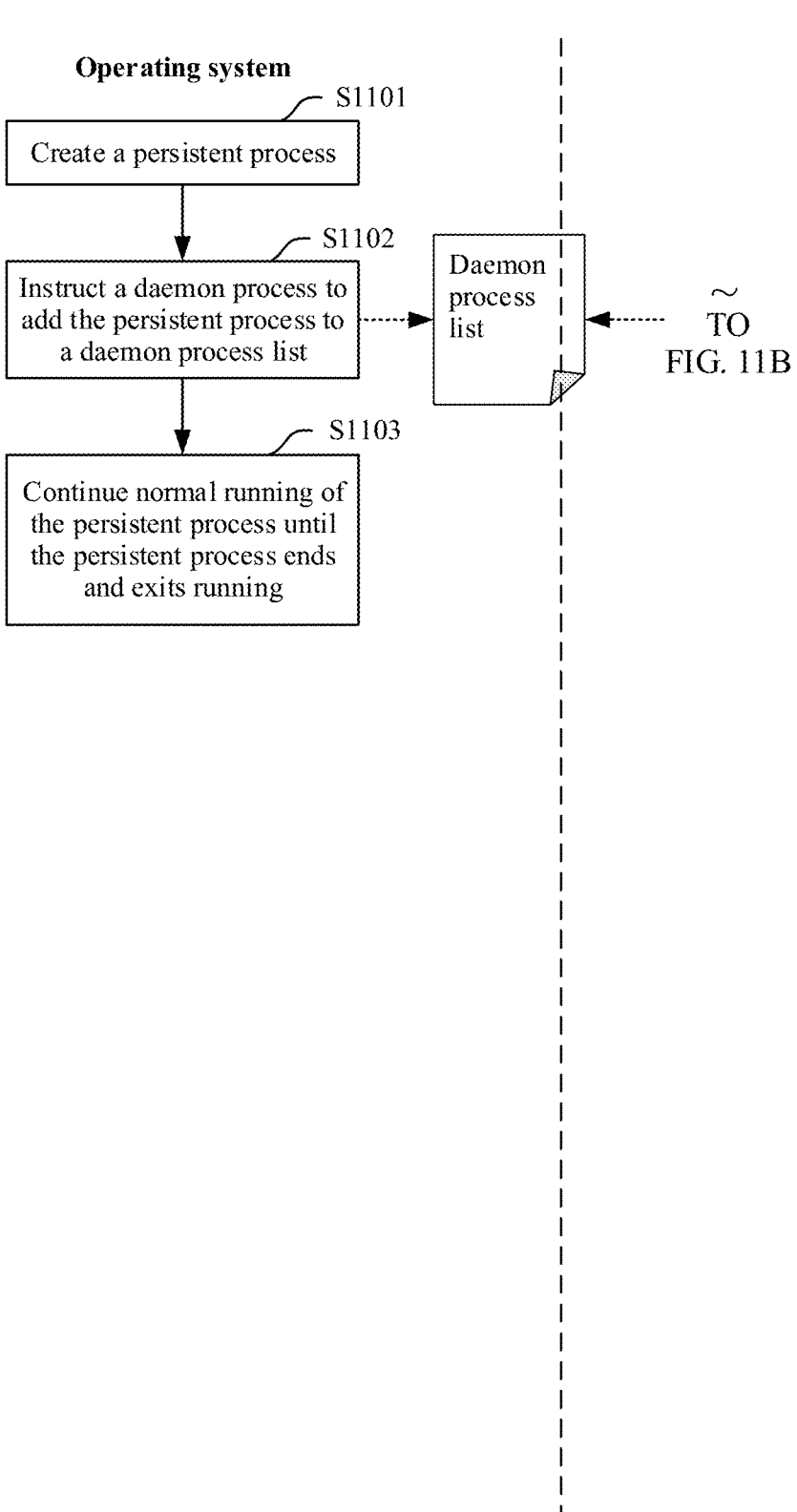
FIG. 11A, FIG. 11B, and FIG. 11C are another schematic flowchart of a process management method according to an embodiment of this application.
Figure 11B:
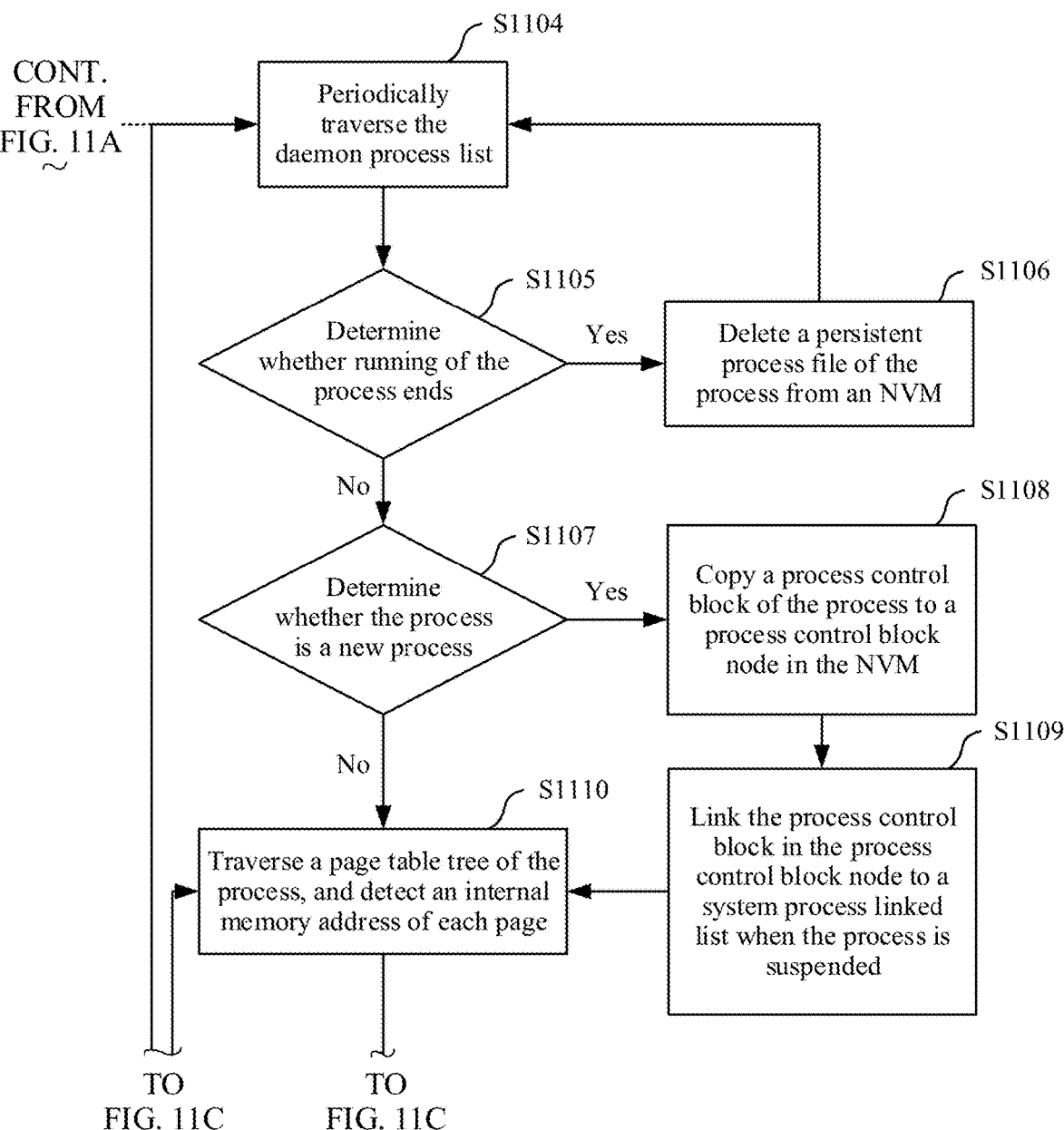
Figure 11C:
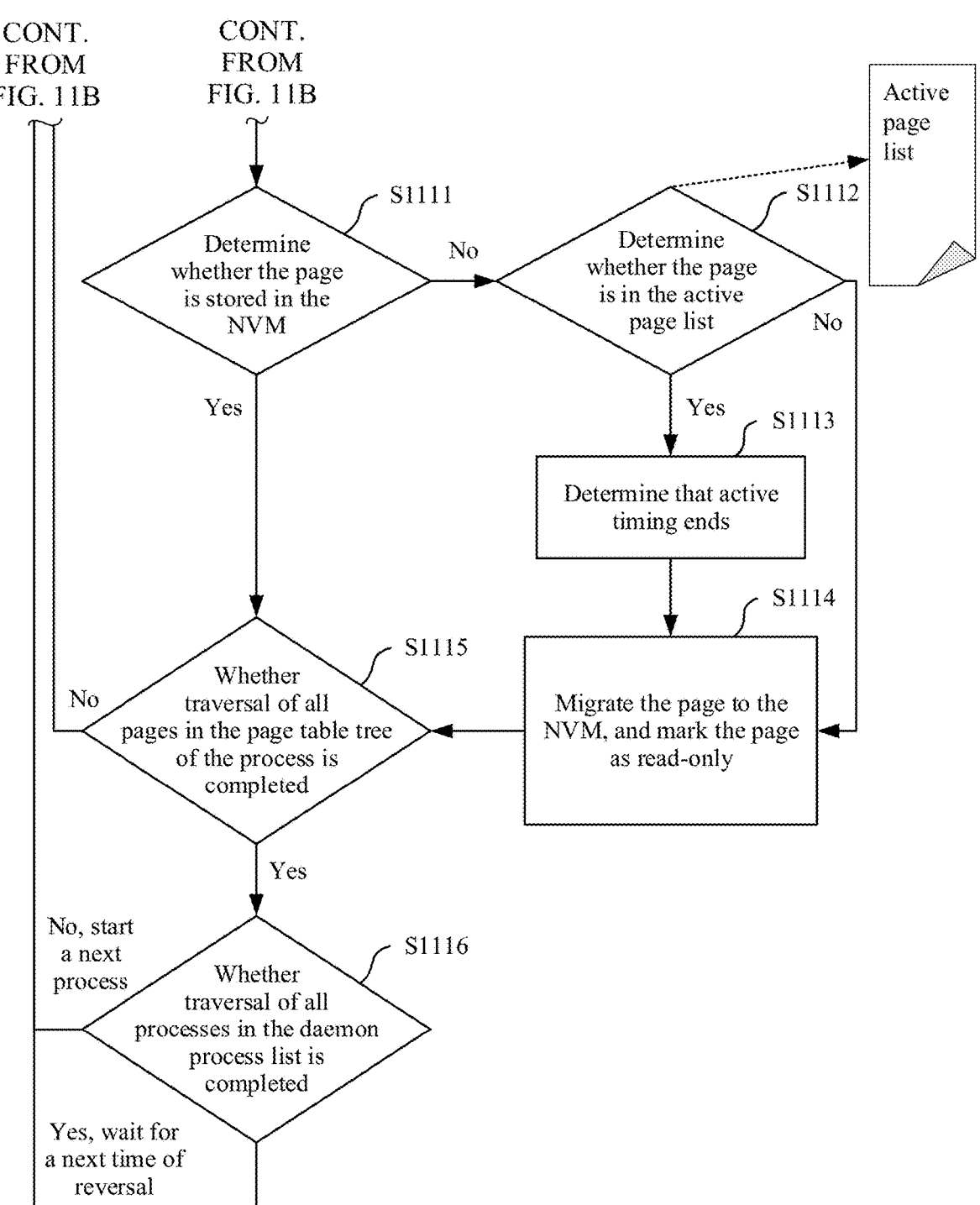

In the J2 persistent process migration phase in the foregoing embodiment, an example in which the persistent process D starts running is used to describe a process in which the daemon process migrates the data related to the persistent process D. The following further describes a migration process of a persistent process from perspectives of an operating system and a daemon process. FIG. 11A, FIG. 11B, and FIG. 11C are another schematic flowchart of a process management method according to an embodiment of this application.

S1101: Create a persistent process.

In a running process, an operating system can create the persistent process. An electronic device stores a to-be-persistent process list. A process recorded in the to-be-persistent process list may be referred to as a persistent process.

For details, refer to the foregoing step S505. Details are not described herein again.

S1102: Instruct a daemon process to add the persistent process to a daemon process list.

For details, refer to the foregoing step S506. Details are not described herein again.

S1103: Continue normal running of the persistent process until the persistent process ends and exits running.

After creating the persistent process, the operating system can continue normal running of the persistent process until the persistent process ends and exits running.

S1104: Periodically traverse the daemon process list.

The daemon process can periodically traverse the daemon process list. The daemon process list records a currently running persistent process.

It may be understood that periodically traversing the daemon process list indicates regularly traversing the daemon process list. To be specific, after traversal of all processes in the daemon process list is completed in one period, the daemon process waits until a next period starts, and then completes traversal of all the processes in the daemon process list in a next period.

Completing traversal of all the processes in the daemon process list in one period indicates sequentially performing subsequent steps S1105 to S1116 on the processes in the daemon process list in duration of the period. After subsequent steps are completed for one process, subsequent steps are performed for a next process recorded in the daemon process list until execution of all subsequent steps are completed for all the processes in the daemon process list.

S1105: Determine whether running of the process ends.

In one period, for a persistent process in the currently traversed daemon process list, it may be first determined whether running of the process ends.

When it is determined that running of the process ends, step S1106 may be performed.

When it is determined that the process still runs, step S1107 may be performed.

S1106: Delete a persistent process file of the process from an NVM.

In one period, if it is determined that running of the persistent process in the currently traversed daemon process list ends, the daemon process may delete the persistent process file of the process from the NVM.

Specifically, the daemon process may delete the persistent process file of the process from a non-volatile process file system in the NVM. The persistent process file of the process may include: a process control block used as an identifier of the persistent process file in a process control block node 222 and a page in a page table tree of the process in a persistent process file data block 224.

After deleting the persistent process file of the process, the daemon process may jump to SS1104 and continue to perform S1104, and perform S1105 to S1116 on a next process of the process in the daemon process list.

S1107: Determine whether the process is a new process.

In one period, if it is determined that running of the persistent process in the currently traversed daemon process list ends, the daemon process may first determine whether the process is a new process.

It may be understood that, if the process is a new process, it indicates that the daemon process has not migrated the process control block of the process to the process control block node 222 in the non-volatile process file system. In other words, the daemon process has not created a persistent process file for the process. If the process is not a new process, it indicates that the daemon process has created a persistent process file for the process in the non-volatile process file system.

When it is determined that the process is a new process, step S1108 may be performed.

When it is determined that the process is not a new process, step S1110 may be directly performed.

S1108: Copy the process control block of the process to the process control block node in the NVM.

If it is determined that the process is a new process, the daemon process may create, for the process, a persistent process file in the non-volatile process file system, and may first copy the process control block of the process to the process control block node in the NVM.

S1109: Link the process control block in the process control block node to a system process linked list when the process is suspended.

After the process control block of the process is copied to the process control block node in the NVM, when the process is suspended, the daemon process links the process control block in the process control block node to the system process linked list.

It may be understood that, after step S1109 is completed, a process of migrating the process control block of the process from a virtual file system to the non-volatile process file system is completed.

S1110: Traverse the page table tree of the process, and detect a memory address of each page.

If it is determined in step S1107 that the process is not a new process, or the process control block of the process is migrated to the process control block node in the NVM, the daemon process may traverse the page table tree of the process and detect the memory address of each page.

For each page in the page table tree of the process, subsequent steps S1111 to S1115 may be sequentially performed until subsequent steps S1111 to S1115 have been performed on all pages in the page table tree of the process, to complete traversal of the page table tree of the process.

S1111: Determine whether the page is stored in the NVM.

For a currently traversed page table, the daemon process may determine whether the page is stored in the NVM, that is, whether the page is stored in the persistent process file data block 224.

If it is determined that the page is not stored in the NVM, that is, the page is still stored in the virtual file system, step S1112 may be performed.

If it is determined that the page is stored in the NVM, step S1115 may be directly performed.

S1112: Determine whether the page is in an active page list.

When determining that the page is not stored in the NVM, the daemon process may determine whether the page is in the active page list.

If it is determined that the page is in the active page list, step S1113 may be performed.

If it is determined that the page is not in the active page list, step S1114 may be directly performed.

S1113: Determine that active timing ends.

When it is determined that the page is not stored in the NVM and is in the active page list, it indicates that the page is an active page, and the daemon process may wait for an end of active timing of the page. After it is determined that active timing of the page ends, that is, the page is deleted from the active page list and is converted to an inactive page, step S1114 may be performed.

S1114: Migrate the page to the NVM, and mark the page as read-only.

When the page is not in the active page list, the daemon process may migrate the page to the NVM and mark the page as read-only.

S1115: Determine whether traversal of all the pages in the page table tree of the process is completed.

After the daemon process may migrate the page to the NVM, it may be determined whether traversal of all the pages in the page table tree of the process is completed.

If traversal of all the pages in the page table tree of the process is not completed yet, execution of step S1110 may be adjusted, and steps S1111 to S1115 are performed on a next page in the page table tree of the process.

If it is determined that traversal of all the pages in the page table tree of the process is completed, that is, all the pages in the page table tree of the process are migrated to the NVM, step S1116 may be performed.

S1116: Determine whether traversal of all the processes in the daemon process list is completed.

After a process control block and all pages in a page table tree of a process in the daemon process list are migrated to the NVM, that is, after creation of a persistent file of the process is completed in the non-volatile process file system 220, the daemon process may determine whether traversal of all the processes in the daemon process list is completed.

If it is determined that traversal of all the processes in the daemon process list is completed, the daemon process may jump to and perform step S1104, wait for a next period to start, and then complete traversal of all the processes in the daemon process list in the next period.

If it is determined that traversal of all the processes in the daemon process list is not completed, the daemon process may jump to and perform step S1104, and perform subsequent steps S1105 to S1116 on a next process recorded in the daemon process list.

It may be understood that, in some embodiments, steps S1101 to S1103 may be performed by an operating system in the electronic device, and steps S1104 to S1116 may be performed by the daemon process in the electronic device. In some embodiments, one or more of steps S1104 to S1116 may also be performed by the operating system. This is not limited herein.

With reference to the foregoing embodiments, the following describes the process management method in embodiments of this application by using, as an example, a scenario in which a temporary power outage occurs in the electronic device after a system is started and then the system is restarted.

Figure 12:
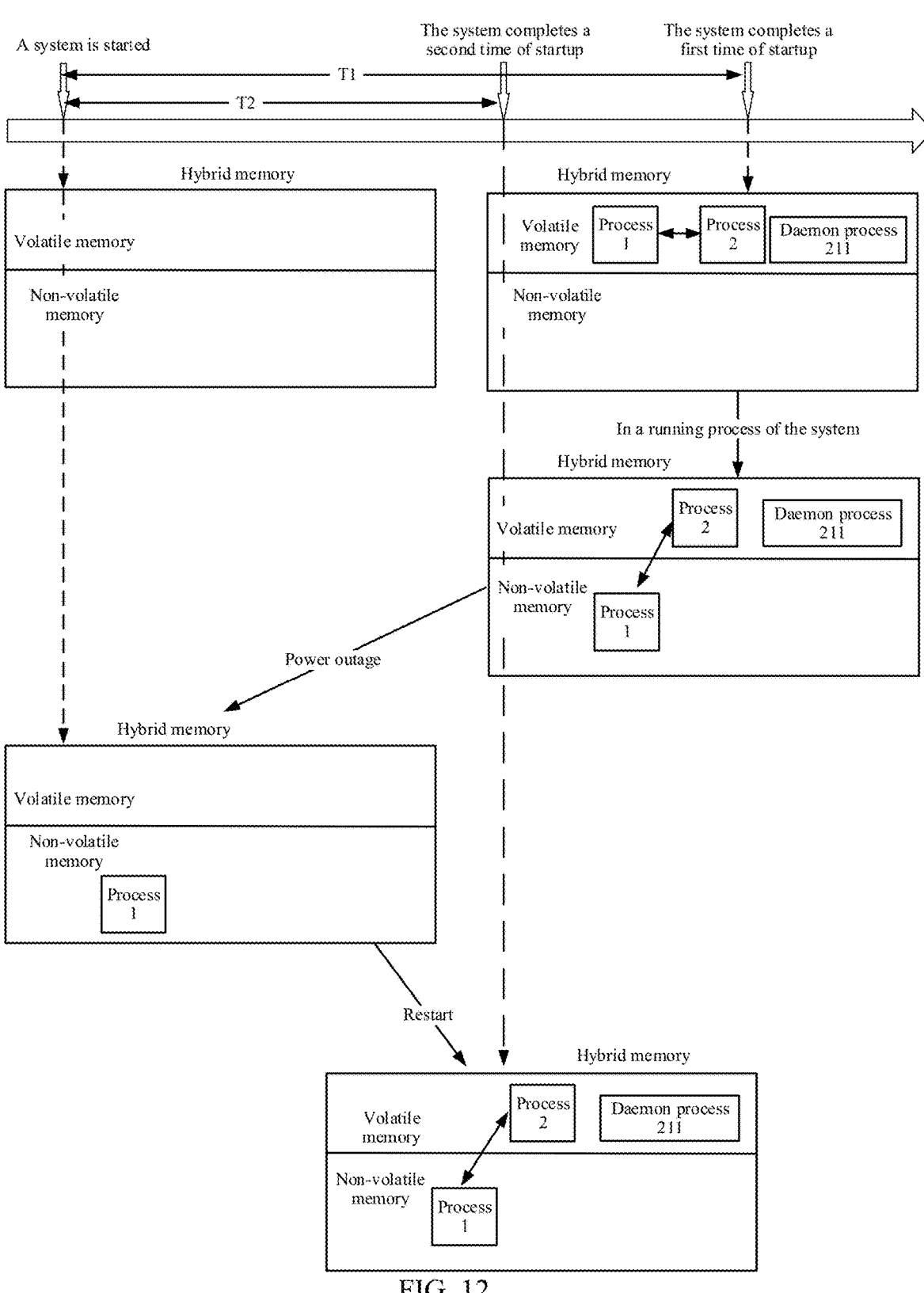
FIG. 12 is a diagram of an example scenario of a process management method according to an embodiment of this application.

FIG. 12 is a diagram of an example scenario of a process management method according to an embodiment of this application.

When a system of an electronic device is started for the first time, no process data is stored in a hybrid memory including a volatile memory and a non-volatile memory. The system starts a daemon process 211 and some other processes related to startup of the system (for example, a process 1 and a process 2) in the volatile memory to complete startup of the system. The process 1 and the process 2 are linked to each other in a system process linked list. A total time used to complete the first time of a startup process of the system may be recorded as T1.

Because the process 1 is a persistent process recorded in a to-be-persistent process list, in a running process of the system, the daemon process 211 migrates related data (a process control block and a page in a page tree table) of the process 1 to an NVM. After the migration, mutual linkage between the process 1 and the process 2 is maintained in the system process linked list. Normal running of the system continues.

At a specific moment in the normal running process of the system, because a temporary power outage occurs in the electronic device, process data of the process 2 in the volatile memory is lost, and a persistent process file of the process 1 in the non-volatile memory is stored normally.

When the user restarts the system, the system only needs to start, in the volatile memory, the daemon process 211 and some other processes, other than the process 1, related to startup of the system (for example, the process 2), to complete startup of the system. The process 2 in the non-volatile memory may be linked to the system process linked list by directly modifying pointers of the process 1 and the process 2. The process 1 does not need to be recreated. This greatly saves time required for new startup. If a total time used for completing a second time of a startup process of the system is denoted as T2, where T2 is less than T1.

In some embodiments of this application, the electronic device is an embedded electronic device. For the embedded electronic device, after an operating system is started, a process of a main application is usually started to execute a task. In some of embodiments of this application, the process of the main application may be referred to as a first process.

It may be understood that, in this embodiment of this application, an objective of completing startup of the system is not only completing startup of the operating system, but also recovering the electronic device to a state in a previous power failure in site after the system is started. In other words, one time of startup of the system is completed, which means that data in the memory of the electronic device is recovered to a state of data in the memory of the electronic device in the previous power failure in site.

The foregoing embodiments are merely intended to describe the technical solutions in this application, but are not intended to limit this application. Although this application is described in detail with reference to the foregoing embodiments, persons of ordinary skill in the art should understand that they may still make modifications to the technical solutions described in the foregoing embodiments or make equivalent replacements to some technical features thereof. However, these modifications or replacements do not make the essence of the corresponding technical solutions depart from the scope of the technical solutions in embodiments of this application.

According to the context, the term "when" used in the foregoing embodiments may be interpreted as a meaning of "if", "after", "in response to determining", or "in response to detecting". Similarly, according to the context, the phrase "when it is determined that . . . " or "if (a stated condition or event) is detected" may be interpreted as a meaning of "if it is determined that . . . ", "in response to determining . . . ", "when (a stated condition or event) is detected", or "in response to detecting (a stated condition or event)".

All or some of the foregoing embodiments may be implemented by using software, hardware, firmware, or any combination thereof. When software is used to implement embodiments, all or some of embodiments may be implemented in a form of a computer program product. The computer program product includes one or more computer instructions. When the computer program instructions are loaded and executed on the computer, all or some procedures or functions in embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

Persons of ordinary skill in the art may understand that all or some of the procedures of the methods in embodiments may be implemented by a computer program instructing related hardware. The program may be stored in the computer-readable storage medium. When the program is executed, the procedures in the method embodiments may be included. The foregoing storage medium includes any medium that can store program code, such as a ROM, a random access memory (RAM), a magnetic disk, or an optical disc.

What is claimed is:

1. A process management method, applied to an electronic device, wherein the electronic device comprises a hybrid memory comprising a volatile memory and a non-volatile memory, and the method comprises:

in a process in which the electronic device starts a system for a first time, generating data of a first process in the volatile memory, wherein duration in which the electronic device completes starting the system for the first time is T1, and the first process is a process recorded in a to-be-persistent process list in the electronic device;

wherein the non-volatile memory comprises a non-volatile process file system which comprises a superblock, a process control block node, a page bitmap, and a persistent process file data block;

in a running process of the system of the electronic device, migrating, by the electronic device, the data of the first process to the non-volatile memory, including:

migrating, by the electronic device, a process control block of the first process to the process control block node in the non-volatile process file system;

migrating, by the electronic device, a page in a page tree table of the first process to the persistent process file data block, wherein the process control block of the first process and the page in the page tree table of the first process form a first persistent process file in the non-volatile process file system, and the process control block of the first process is used as an identifier of the first persistent process file; and keeping normal running of the system of the electronic device;

in a process in which the electronic device starts the system for a second time, linking, by the electronic device, the data of the first process in the non-volatile memory to a system process linked list, wherein duration in which the electronic device completes starting the system for the second time is T2, and T2 is less than T1; and wherein the system process linked list includes a plurality of process control blocks (PCBs) corresponding to a plurality of different persistent processes run by the electronic device.

2. The method according to claim 1, further comprising:

in the running process of the system of the electronic device, generating, by the electronic device, data of a second process in the volatile memory, wherein the second process is different from the first process, and the second process is another process recorded in the to-be-persistent process list; and based on the second process being suspended, migrating, by the electronic device, the data of the second process to the non-volatile memory.

3. The method according to claim 2, wherein the migrating, by the electronic device, the data of the second process to the non-volatile memory further comprises:

migrating, by the electronic device, a process control block of the second process to the process control block node in the non-volatile process file system; and migrating, by the electronic device, a page in a page tree table of the second process to the persistent process file data block, wherein the process control block of the second process and the page in the page tree table of the second process form a second persistent process file in the non-volatile process file system, and the process control block of the second process is used as an identifier of the second persistent process file.

4. The method according to claim 3, further comprising:

periodically backing up, by the electronic device, a persistent process file in the non-volatile process file system to an external memory, wherein the persistent process file comprises the first persistent process file and the second persistent process file.

5. The method according to claim 3, further comprising:

after running of the second process ends, deleting, by the electronic device, the second persistent process file from the non-volatile process file system.

6. The method according to claim 3, wherein the migrating, by the electronic device, the process control block of the second process to the process control block node in the non-volatile process file system further comprises:

copying, by the electronic device, the process control block of the second process to the process control block node in the non-volatile process file system;

based on the second process being suspended, linking, by the electronic device, the process control block of the second process in the process control block node to the system process linked list; and deleting, by the electronic device, the process control block of the second process from the volatile memory.

7. The method according to claim 3, wherein the migrating, by the electronic device, the page in the page tree table of the second process to the persistent process file data block further comprises:

based on the page in the page tree table of the second process being not in an active page list, moving, by the electronic device, the page in the page tree table of the second process to the persistent process file data block, and performing linking related data to the page tree table of the second process.

8. The method according to claim 3, further comprising:

updating, by the electronic device, a first page in the page tree table of the second process in the non-volatile process file system.

9. The method according to claim 3, wherein after migrating the page in the page tree table of the second process to the persistent process file data block, the method further comprises:

marking, by the electronic device as read-only, a second page in the page tree table of the second process in the persistent process file data block;

after it is determined that the second page is added to an active page list, migrating, by the electronic device, the second page to a virtual file system in the volatile memory; and updating, by the electronic device, the second page in the virtual file system.

10. The method according to claim 9, further comprising:

after a power failure message or an exit message is received, migrating, by the electronic device, the second page to the persistent process file data block.

11. An electronic device, comprising:

one or more processors;

a storage, coupled to the one or more processors and storing computer program code comprising computer instructions, wherein the storage further comprises a volatile memory and a non-volatile memory, and the volatile memory and the non-volatile memory form a hybrid memory; and wherein the one or more processors execute the computer instructions, to enable the electronic device to perform the following:

in a process in which the electronic device starts a system for a first time, generating data of a first process in the volatile memory, wherein duration in which the electronic device completes starting the system for the first time is T1, and the first process is a process recorded in a to-be-persistent process list in the electronic device;

wherein the non-volatile memory comprises a non-volatile process file system which comprises a superblock, a process control block node, a page bitmap, and a persistent process file data block;

in a running process of the system of the electronic device, migrating, the data of the first process to the non-volatile memory, including:

migrating, by the electronic device, a process control block of the first process to the process control block node in the non-volatile process file system;

migrating, by the electronic device, a page in a page tree table of the first process to the persistent process file data block, wherein the process control block of the first process and the page in the page tree table of the first process form a first persistent process file in the non-volatile process file system, and the process control block of the first process is used as an identifier of the first persistent process file; and keeping normal running of the system of the electronic device;

in a process in which the electronic device starts the system for a second time, linking, the data of the first process in the non-volatile memory to a system process linked list, wherein duration in which the electronic device completes starting the system for the second time is T2, and T2 is less than T1; and wherein the system process linked list includes a plurality of process control blocks (PCBs) corresponding to a plurality of different persistent processes run by the electronic device.

12. The electronic device according to claim 11, wherein the one or more processors further execute the computer instructions, to enable the electronic device to perform the following:

in the running process of the system of the electronic device, generating, data of a second process in the volatile memory, wherein the second process is different from the first process, and the second process is another process recorded in the to-be-persistent process list; and based on the second process being suspended, migrating, by the electronic device, the data of the second process to the non-volatile memory.

13. The electronic device according to claim 12, wherein the migrating the data of the second process to the non-volatile memory specifically comprises:

migrating, a process control block of the second process to the process control block node in the non-volatile process file system; and migrating, a page in a page tree table of the second process to the persistent process file data block, wherein the process control block of the second process and the page in the page tree table of the second process form a second persistent process file in the non-volatile process file system, and the process control block of the second process is used as an identifier of the second persistent process file.

14. The electronic device according to claim 13, wherein the one or more processors further execute the computer instructions, to enable the electronic device to perform the following:

periodically backing up, a persistent process file in the non-volatile process file system to an external memory, wherein the persistent process file comprises the first persistent process file and the second persistent process file.

15. The electronic device according to claim 13, wherein the one or more processors further execute the computer instructions, to enable the electronic device to perform the following:

after running of the second process ends, deleting, the second persistent process file from the non-volatile process file system.

16. The electronic device according to claim 13, wherein the migrating the process control block of the second process to the process control block node in the non-volatile process file system further comprises:

copying, the process control block of the second process to the process control block node in the non-volatile process file system;

based on the second process being suspended, linking, the process control block of the second process in the process control block node to the system process linked list; and deleting, the process control block of the second process from the volatile memory.

17. The electronic device according to claim 13, wherein the migrating the page in the page tree table of the second process to the persistent process file data block further comprises:

based on the page in the page tree table of the second process being not in an active page list, moving, the page in the page tree table of the second process to the persistent process file data block, and performing linking related data to the page tree table of the second process.

18. The electronic device according to claim 13, wherein the one or more processors further execute the computer instructions, to enable the electronic device to perform the following:

updating, a first page in the page tree table of the second process in the non-volatile process file system.

19. The electronic device according to claim 13, wherein after migrating the page in the page tree table of the second process to the persistent process file data block, the one or more processors are further configured to execute the computer instructions, to enable the electronic device to perform the following:

marking, as read-only, a second page in the page tree table of the second process in the persistent process file data block;

after it is determined that the second page is added to an active page list, migrating, the second page to a virtual file system in the volatile memory; and updating, the second page in the virtual file system.

20. A chip system, wherein the chip system is used in an electronic device comprising a hybrid memory including a volatile memory and a non-volatile memory, and comprises one or more processors configured to execute computer instructions, to enable the electronic device to perform the following:

in a process in which the electronic device starts a system for a first time, generating data of a first process in the volatile memory, wherein duration in which the electronic device completes starting the system for the first time is T1, and the first process is a process recorded in a to-be-persistent process list in the electronic device;

wherein the non-volatile memory comprises a non-volatile process file system which comprises a superblock, a process control block node, a page bitmap, and a persistent process file data block;

in a running process of the system of the electronic device, migrating, the data of the first process to the non-volatile memory, including:

migrating, by the electronic device, a process control block of the first process to the process control block node in the non-volatile process file system;

migrating, by the electronic device, a page in a page tree table of the first process to the persistent process file data block, wherein the process control block of the first process and the page in the page tree table of the first process form a first persistent process file in the non-volatile process file system, and the process control block of the first process is used as an identifier of the first persistent process file; and keeping normal running of the system of the electronic device;

in a process in which the electronic device starts the system for a second time, linking, the data of the first process in the non-volatile memory to a system process linked list, wherein duration in which the electronic device completes starting the system for the second time is T2, and T2 is less than T1; and wherein the system process linked list includes a plurality of process control blocks (PCBs) corresponding to a plurality of different persistent processes run by the electronic device.

* * * * *